(12) United States Patent
Wilson et al.

(10) Patent No.: US 10,373,460 B2
(45) Date of Patent: Aug. 6, 2019

(54) INTEGRATED SECURITY NETWORK

(71) Applicants: David Stuart Wilson, Alpine, UT (US); Andrew Wilson, Lake Mary, FL (US)

(72) Inventors: David Stuart Wilson, Alpine, UT (US); Andrew Wilson, Lake Mary, FL (US)

(73) Assignee: Securenet Technologies, LLC, Lake Mary, FL (US)

( * ) Notice: Subject to any disclaimer, the term of this patent is extended or adjusted under 35 U.S.C. 154(b) by 0 days.

(21) Appl. No.: 15/984,867

(22) Filed: May 21, 2018

(65) Prior Publication Data

US 2018/0293859 A1 Oct. 11, 2018

Related U.S. Application Data

(62) Division of application No. 15/229,055, filed on Aug. 4, 2016, now Pat. No. 10,002,507.

(30) Foreign Application Priority Data

| Aug. 5, 2015 | (AU) | 2015903131 |
| Aug. 5, 2015 | (AU) | 2015903132 |
| Aug. 5, 2015 | (AU) | 2015903133 |
| Aug. 5, 2015 | (AU) | 2015903134 |
| Aug. 5, 2015 | (AU) | 2015903135 |
| Aug. 5, 2015 | (AU) | 2015903136 |

(Continued)

(51) Int. Cl.
*G08B 13/196* (2006.01)
*G08B 25/00* (2006.01)

(Continued)

(52) U.S. Cl.
CPC ..... *G08B 13/19656* (2013.01); *G08B 25/002* (2013.01); *G08B 25/14* (2013.01);
(Continued)

(58) Field of Classification Search
CPC ........ G08B 13/19656; G08B 13/19665; G08B 25/002; G08B 25/14; H04L 9/00
See application file for complete search history.

(56) References Cited

U.S. PATENT DOCUMENTS

| 2006/0056605 A1* | 3/2006 | Whitfield | H04L 63/0428 379/106.01 |
| 2010/0277300 A1* | 11/2010 | Cohn | G08B 29/02 340/506 |
| 2010/0277315 A1* | 11/2010 | Cohn | G08B 29/02 340/540 |

* cited by examiner

*Primary Examiner* — Leon Flores
(74) *Attorney, Agent, or Firm* — Royal W. Craig; Gordon Feinblatt LLC

(57) ABSTRACT

A security system architecture and method of operation that combines a local security network with control panel and sensors, a central monitoring station (CMS), and a separate operator computer server that provides a web portal for both the homeowner and CMS, that maintains a persistent connection between the control panel and CMS allowing failsafe dual-path signaling. This dual-path signaling technique is extended to provide an effective "smash and grab alarm", and various approaches to dual-path signal management are disclosed including handshaking, persistent domain monitoring, relayed Operator 3-to-CMS signaling, etc. Improved processes for remotely accessing video are also disclosed along with an improved process for remote control panel configuration, and control panel interfacing with home automation appliances.

13 Claims, 9 Drawing Sheets

(30) Foreign Application Priority Data

| | | | |
|---|---|---|---|
| Aug. 5, 2015 | (AU) | ................................ | 2015903137 |
| Aug. 5, 2015 | (AU) | ................................ | 2015903138 |
| Aug. 5, 2015 | (AU) | ................................ | 2015903139 |
| Aug. 5, 2015 | (AU) | ................................ | 2015903140 |

(51) Int. Cl.
*G08B 25/14* (2006.01)
*H04L 9/00* (2006.01)
G08B 29/04 (2006.01)
H04L 9/08 (2006.01)

(52) U.S. Cl.
CPC .......... *H04L 9/00* (2013.01); *G08B 13/19665* (2013.01); *G08B 29/046* (2013.01); *H04L 9/0819* (2013.01)

INTEGRATED SECURITY NETWORK

CROSS-REFERENCE TO RELATED APPLICATIONS

The present application is a division of U.S. patent application Ser. No. 15/229,055 filed on Aug. 4, 2016 which is incorporated herein by reference. U.S. patent application Ser. No. 15/229,055 in turn derives priority from Australian provisional patent application number 2015903140 filed 5 Aug. 2015, Australian provisional patent application number 2015903139 filed 5 Aug. 2015, Australian provisional patent application number 2015903138 filed 5 Aug. 2015, Australian provisional patent application number 2015903137 filed 5 Aug. 2015, Australian provisional patent application number 2015903136 filed 5 Aug. 2015, Australian provisional patent application number 2015903135 filed 5 Aug. 2015, Australian provisional patent application number 2015903134 filed 5 Aug. 2015, Australian provisional patent application number 2015903133 filed 5 Aug. 2015, Australian provisional patent application number 2015903132 filed 5 Aug. 2015, and Australian provisional patent application number 2015903131, filed 5 Aug. 2015, the entirety of which is incorporated herein by reference.

BACKGROUND OF THE INVENTION

1. Field of the Invention

The present invention relates generally to security monitoring and in particular to networking in an integrated security network.

2. Description of the Background

Conventional business or residential security systems use trip sensors placed along doors, windows, motion sensors, glass breakage detectors, panic or medic alert buttons, etc. If the system is armed and a sensor is tripped, a signal is sent to the local control panel which may sound and alarm and auto-dial a central monitoring station (CMS). Traditional security systems communicate alarm event information directly to the central monitoring station (CMS) in a variety of ways including radio, cellular and network communications. For example, with a cellular connection made the control panel wirelessly communicates with the CMS private data network by internet protocol (IP). To do this, the CMS maintains a dedicated wireless receiver for each control panel so that alarm messages are received. This inherently compels a one-way communication scheme, control panel-to-receiver to CMS. Moreover, the occurrence of an alarm provides no indication of its cause and so the CMS has no means to distinguish a real intruder from a false alarm. The one-way communication scheme also presents an array of other issues in case of network failure, disablement of the control panel, etc. Just as an example, in conventional security monitoring networks, for the purposes of reducing or eliminating false alarms, alarm control panels are configured to wait for a predetermined period prior to sending an alarm signal to a central station. For example, when entering a premises, a homeowner may have 3 minutes from the opening of the front door to disable the alarm control panel. If the alarm control panel is not disabled within this predetermined time period, the alarm control panel is adapted to send an alarm signal to the central station. However, a problem with such arrangements is that the alarm control panel may be disabled by an intruder prior to being able to send the alarm signal. For example, the home security system may be physically smashed or removed. Conventional arrangements have attempted to address this problem by concealment of the home security componentry. However, concealment does not solve the problem for intruders having knowledge of the security system installation. Furthermore, the home power supply may be disconnected by the intruder prior to the control panel being able to send the alarm signal. Conventional arrangements have attempted to address this problem through utilization of battery backup and the like. However, battery backup systems are not failsafe and may themselves be disconnected by the intruder. Furthermore, the communication interface of the alarm control panel may be disabled wherein, for example, the intruder may disconnect the communication interface of the alarm control panel, utilize cellular jamming devices and the like.

Not only is there one-way communication between the control panel and CMS, but there is also one-way communication between a network operator and the CMS. This creates its own set of limitations. For example, the network operator may wish to send account configuration requests and the like to the CMS but is unable to do so.

SUMMARY OF THE INVENTION

It is, therefore, an object of the invention to provide a security system architecture and method for use thereof that provides failsafe "dual-path" communications in a variety of scenarios, such as when intruders physically smash and/or remove an alarm control panel, interfere with the communication interface, or pull the power supply.

It is another object to provide an operator server to monitor the status of the control panel and, should it be disabled, send a secondary alarm signal to the CMS.

It is another object to provide an alarm control panel in dual communication with both an operator server and a CMS receiver that can receive a signal from an operator server and forward it to the CMS receiver.

It is another object to provide an operator server adapted for to send/receive a "heartbeat" signal to/from the CMS receiver which, if interrupted, indicates unavailability.

It is another object to provide an architecture as above with video enhancements, including an operator server adapted for video data networking in an integrated security network that authenticates users, establishes a peer-to-peer data connection between a designated video camera and remote user computers such that users can receive a live video stream and/or archive video. In this latter regard, it is another object to dynamically generate destination paths comprising a camera ID and the date and time and archive video data directly to the generated path so as to negate the subsequent moving of the video data.

It is another object to provide a security system architecture and method for use thereof that integrates a method for the distribution of private shared keys across a security monitoring network so that control panels cannot communicate with the incorrect CMS receiver and hackers cannot spoof an active connection with the CMS receiver.

It is another object to provide an operator server configured for downloading configuration settings from a database specific to particular alarm control panel types, providers, customer types, individual customers, regions, etc.

It is still another object to provide an alarm control panel adapted for home owner activity simulation by interfacing with home automation devices to initiate/simulate home owner activity simulation.

In accordance with the foregoing objects, there is provided a security system architecture and method of operation that combines a local security network having a control panel and sensors, and a central monitoring station (CMS), with a separate operator computer server that provides a web portal for both the homeowner and CMS, and that maintains a persistent connection between the control panel and CMS allowing failsafe communication, home automation, remote configuration, diagnostic, security, and video streaming and archiving capabilities. During installation, the control panel firmware/software and/or configuration settings are configured so as to cause the control panel to send alarm signals to both the receiver and the operator server simultaneously. This dual-path signaling technique is extended to provide an effective "smash and grab alarm." Various approaches to dual-path signal management are disclosed including handshaking, persistent domain monitoring, relayed Operator 3-to-CMS signaling, etc.

In another aspect, an improved process for remotely accessing video is disclosed including video peer-to-peer handoffs of live video from the operator server, and more efficient video archiving.

In yet another aspect, an improved process for remote control panel configuration is disclosed, along with control panel interfacing with home automation appliances, and other aspects of the invention are disclosed.

BRIEF DESCRIPTION OF THE DRAWINGS

The objects, features, and advantages of the present invention will become apparent from the following detailed description of the preferred embodiments and certain modifications thereof when taken together with the accompanying drawings in which like numbers represent like items throughout and in which.

DETAILED DESCRIPTION OF THE PREFERRED EMBODIMENT

Figure 1:
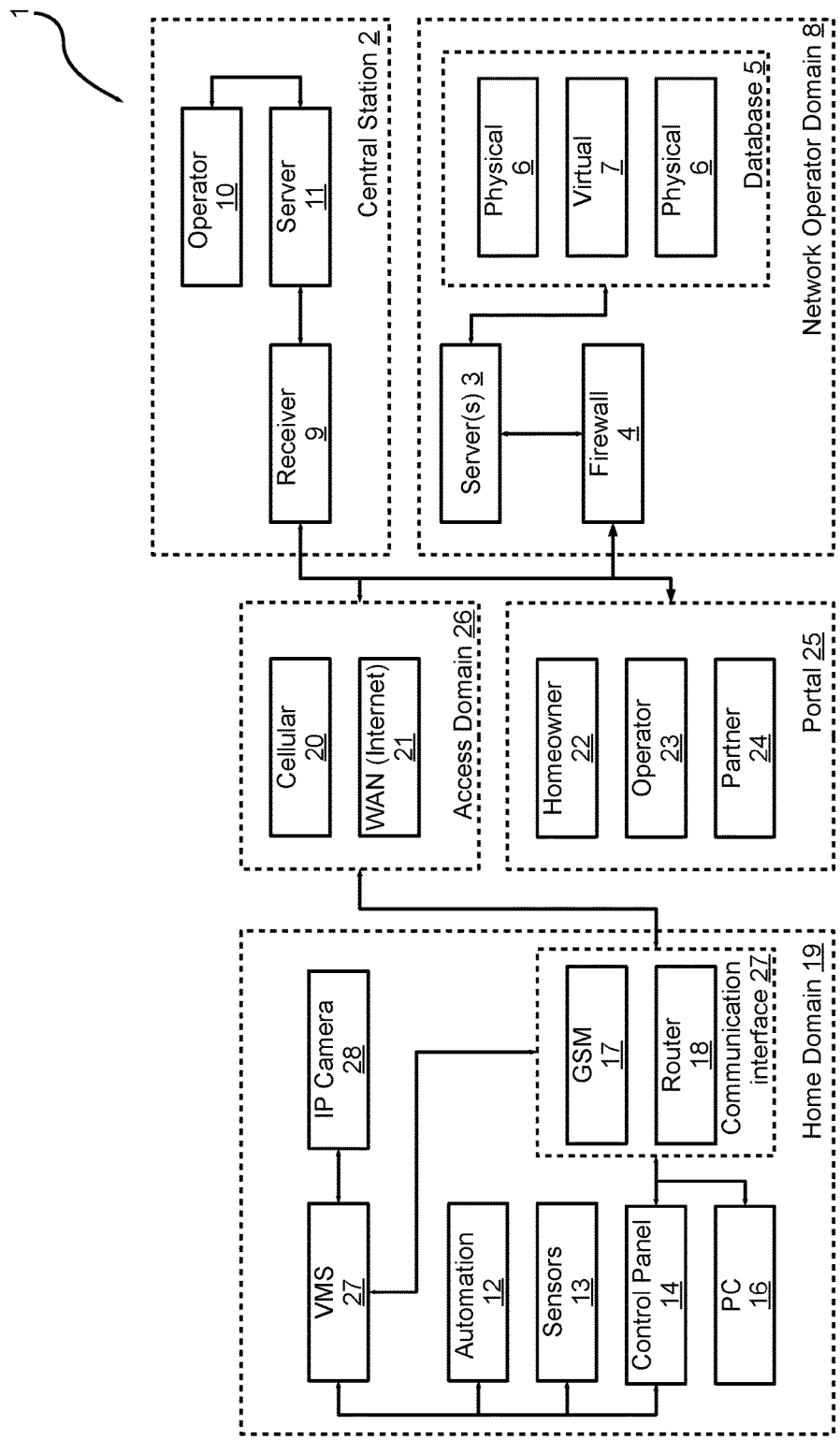
FIG. 1 shows an integrated security network in accordance with an embodiment of the present disclosure.

For the purposes of promoting an understanding of the principles of the invention, reference will now be made to the exemplary embodiment illustrated in the drawings and described below. The embodiment disclosed is not intended to be exhaustive or limit the invention to the precise form disclosed in the following detailed description. Rather, the embodiment is chosen and described so that others skilled in the art may utilize its teachings. It will be understood that no limitation of the scope of the invention is thereby intended. The invention includes any alterations and modifications in the illustrated device, the methods of operation, and further applications of the principles of the invention as would normally occur to one skilled in the art to which the invention relates.

The present invention includes both the system architecture and hardware as well as the computer processes.

As herein defined the term "Automation Server" means a software application that exposes programmable objects (called Automation Objects) to other applications (called Automation Clients).

"Portal" means an Internet site providing access or links to other sites.

"Ping" is a computer network administration instruction used to test the reachability of a host on an Internet Protocol (IP) network by measuring round-trip time for messages sent from the originating host to a destination computer that are echoed back to the source.

"Pre-shared key (PSK)" is a shared secret which that was previously shared between the two devices using some secure channel before it needs to be used.

"Wireless" includes circuits, devices, systems, methods, techniques, communications channels, etc., that may communicate data through the use of modulated electromagnetic radiation through a non-solid medium by WLAN standards, Bluetooth, and other wireless standards. Applications that can be accommodated include IEEE 802.11 wireless LANs and links, and wireless Ethernet.

Terms such as "processing", "computing", "calculating", "determining", "analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "Processor" may refer to any device or portion of a device that processes electronic data, e.g., from registers and/or memory to transform that electronic data into other electronic data that, e.g., may be stored in registers and/or memory. A "computer" or a "computing device" or a "computing machine" or a "computing platform" may include one or more processors. The processing system further may include a memory subsystem including main RAM and/or a static RAM, and/or ROM.

Thus, as will be appreciated by those skilled in the art, embodiments of the present invention may be embodied as a method, an apparatus such as a special purpose apparatus, an apparatus such as a data processing system, or a computer-readable carrier medium carrying a set of instructions, e.g., a computer program that are for execution on one or more processors. The computer-readable carrier medium carries computer readable code including a set of instructions that when executed on one or more processors cause a processor or processors to implement a method.

Similarly it should be appreciated that in the above description of example embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Furthermore, while some embodiments described herein include some but not other features included in other embodiments, combinations of features of different embodiments are meant to be within the scope of the invention, and form different embodiments, as would be understood by those in the art.

Turning now to FIG. 1, an embodiment of the integrated security system 1 is shown in accordance with the invention. The system 1 is characterized by a plurality of distinct domains, including a home domain 19, access domain 26, network operator domain 8, portal 25 and central monitoring station (CMS) 2. The system 1 as a whole is adapted for monitoring any number of home domains 19 which may be residential and/or commercial properties. Alarm signals and other information are transmitted from the home domain(s) 19, via the access domain 26 to the CMS 2 and the network operator domain 8 for event notification, management and response purposes.

Specifically, each home domain 19 comprises an alarm control panel 14, being the interface between the access domain 26 and the various on-premises security devices. The control panel 14 takes the form of a computing device as will be described in further detail below with reference to FIG. 2. The control panel 14 comprises processing, storage and human interface capabilities. In embodiments, control panel 14 may be provided as an integrated unit, such as a wall mounted unit or the like. In other embodiments, the control panel 14 may comprise constituent components in operable communication with each other, such as by comprising a separate processor, storage and human interface module. Generally, the control panel 14 takes the form of a low-power robust computing device, such as one comprising an embedded controller for firmware or low-power processor operating the Linux operating system, for example. The alarm control panel 14 may communicate with the various on-premises security devices by way of wired or wireless interface. The control panel 14 is in operable communication with one or more security sensors 13 so as to receive sensor data therefrom. Differing types of security sensor 13 may be utilized depending on the application but may include, for example, passive infrared motion sensors, reed switch window and door opening sensors, inertial sensors, carbon monoxide sensors and the like.

The control panel 14 may further interface with one or more home automation devices 12 for the purposes of controlling lighting, blinds and curtains, door latches, air-conditioning systems, hot water systems and the like.

The control panel 14 may further interface with one or more IP cameras 28 for the purposes of receiving IP security footage. Various IP cameras 28 may interface with a video management server 27 at the home domain 19. The video management server 27 may comprise local storage capabilities for the purposes of the storage of video footage. In embodiments, the video management server 27 may interface with the control panel 14 or alternatively interface with communication interface 15 (described below).

The home domain 19 further comprises a communication interface 27 for the purposes of sending and receiving data across the access domain 26. In one embodiment, the communication interface 15 comprises a home router 18 as a LAN/WAN interface. In this manner, the home domain 19 may communicate across an Ethernet or Wi-Fi LAN and send and receive data across the Internet 21. The communication interface 27 may alternately or additionally comprise a GSM (Global System for Mobile communication) digital mobile telephony interface 17 for the purposes of sending and receiving data across a cellular network 20. Both a LAN/WAN interface (router 18) and GSM interface 17 have an advantage of providing communications redundancy, wherein, for example, should the WAN interface become unavailable or intentionally disconnected by an intruder, for example, the GSM interface 17 may serve as a backup. In still further embodiments, the communications interface 15 may further comprise a plain old telephone service (POTS) interface as an alternative, or in addition to the GSM interface 17 or router 18.

As alluded to above, the system 1 further comprises the network operator domain 8 adapted for performing various network operation functionality as is described herein. The network operator domain 8 comprises one or more operator servers 3 adapted to communicate with the home domain 19 and CMS 2. In embodiments, the network operator domain 8 may be provided as a hosted solution comprising cloud based physical or virtual servers 3. The operator servers 3 may interface with the access domain 26 by way of firewall 4, another interfaces, such as load balancers and the like. The network operator domain 8 further comprises a database 5. The database 5 may be composed of physical 6 and/or virtual 7 databases. In embodiments, the database 5 may take the form of a relational database.

The system 1 further comprises the CMS 2 adapted for receiving and managing local alarm signals and other information from the various control panels 14. As such, the CMS 2 further comprises a receiver 9 in operable communication with the access domain 26 for the purposes of sending and receiving information to and from the alarm control panel 14 of the home domain 19. Typically, a CMS 2 will employ a plurality of receivers 9 each having a primary and secondary identification number which is usually a telephone number or IP address that the local control panel 14 calls to transmit information to the CMS 2. The secondary number is used in case the primary number is busy. The receiver 9 identification number or numbers is a unique number that is only assigned to that particular receiver 9.

The CMS 2 further comprises Automation Server 11 for performing various software implemented functionality. The Automation Server 11 may interface with an operator station 10 operated by a human operator.

Furthermore, the security system 1 further comprises a portal 25 maintained by the network operator 8 for allowing external access by authorized third parties. In one embodiment, the portal 25 comprises an operator interface 23 for the purposes of allowing the network operator to interface with the network operator server 3, such as for the purposes of managing the operator server 3 and the database 5 utilizing a client computing device. Furthermore, the portal 25 may comprise a user/homeowner interface 22 adapted to allow the end user to interface with the network operator server 3, such as for the purposes of receiving alerts, responding to prompts, viewing IP footage and the like, again, using a client computing device. Furthermore, the portal 25 preferably comprises a partner interface 24 for allowing various third party data partners to interface with the network operator server 3.

Figure 2:
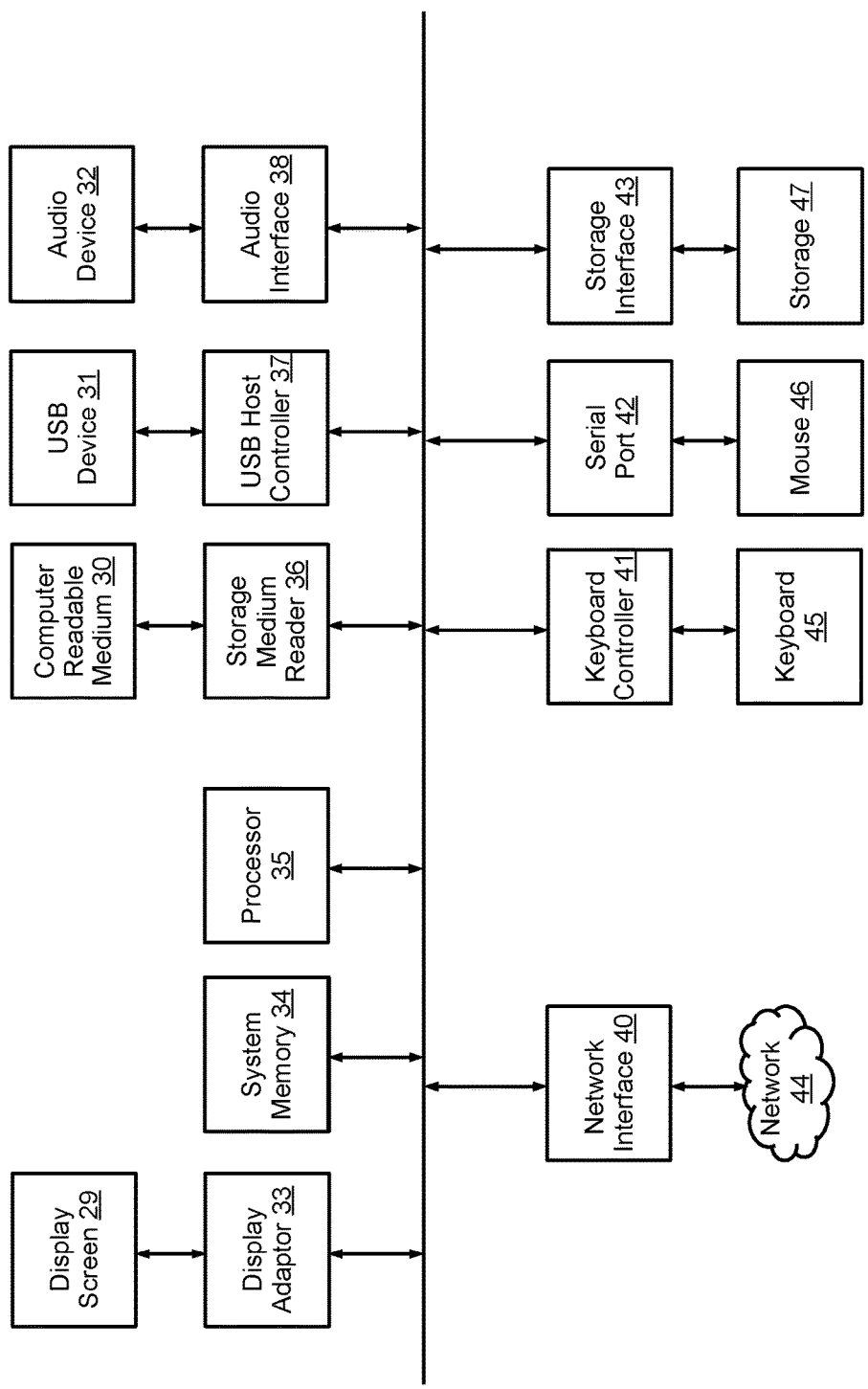
FIG. 2 shows a computing device for implementation is any one of the computing devices of the network of FIG. 1 in accordance with an embodiment of the present disclosure.

FIG. 2 illustrates an exemplary computing device 48 which may be implemented as any one of the above-mentioned computing devices of the security system 1. Specifically, the computing device 8 can be used to implement the control panel 14, network operator server 3, CMS receiver 9, CMS server 11 and the like. As such, the computing device 48 comprises a processor 35 for processing digital data, and non-transitory system memory 34 for storing digital data, including computer program code. In use, the processor 35 and the system memory 34 cooperate to implement the computing fetch, decode and execute cycle to implement the functionality described herein. In this manner, various functionality described herein may be implemented by way of software comprising computer code instructions operable to cause the processor 35 to implement the steps of the methods described herein. Said computer program code may be loaded into the system memory 34 by way of storage medium reader 36 adapted to read the computer code instructions from a computer readable medium 30, such as a magnetic, optical disc or the like. Alternately, the computer program code may be provided by way of a network interface 40 adapted to receive such computer program code across a computer network 44. Specifically, where the alarm control panel 14 is a computing device 48 it may be adapted for firmware and/or configuration setting update across the network 44. In this manner, the network operator server 3, may, for example, provide firmware updates for various control panels 14. The computing device 48 further comprises a display adapter 33 adapted to interface with a display screen 29 for the purposes of displaying digital data such as status of the alarm control panel 14. The computing device 48 may further comprises storage interface 43, such as for the purposes of interfacing with storage which may take the form of a local or remotely located magnetic disk or solid state storage device or the like. The computer 48 may further comprise a keyboard controller 41 adapted to interface with a keyboard 45 so as to receive user keyboard strokes. Furthermore, the computing device 48 may comprise an audio interface 38 adapted to interface with audio device 32 for the purposes of outputting various sounds, audio tones and the like. The computing device 48 may further comprise a serial port 42 for the purposes of interfacing with a mouse 46 or other pointing user interface device, and a USB host controller 37, such as for the purposes of sending and receiving data to one or more USB devices 31.

Given the foregoing hardware and software architecture, the system 1 incorporates several computer-implemented processes for enhanced functionality. Each is described in detail below.

A. Failsafe Communication i. Alarm Control Panel Dual Path Signaling

In accordance with the further embodiment of the present disclosure, there will now be described an alarm control panel 14 configured for dual path signaling.

Turning now to FIG. 1, as alluded to above signals generated by the control panel 14 are forwarded, via the access domain 26 to the network operator server 3 to fulfill certain network operation requirements. After having performed the requisite processing, the operator server 3 forwards the signals to the receiver 9 for further action. Any intermediary processing by the operator server 3 may cause delays in the receipt of the signal by the receiver 9. Furthermore, the operator server 3 may go off-line, or otherwise experience network interruption thereby disrupting the communication path between the control panel 14 and the receiver 9. To avoid this, the control panel 14 of the present invention is configured to send signals substantially simultaneously to both the receiver 9 at CMS 2 and the operator server 3. This dual-path reporting of alarm signals direct to the CMS 2 as well as to operator server 3 with no intermediary clearing house eliminates the potential for network delay and/or communication interrupt caused by the operator server 3. Nevertheless, dual sending of the signal to the operator server 3 allows for the requisite processing of the signal by the operator server 3 to fulfill network operational requirements.

To accomplish the foregoing, during installation, the control panel 14 firmware/software and/or configuration settings are configured so as to cause the control panel 14 to send alarm signals to both the receiver 9 and the operator server 3. Specifically, the control panel 14 may be configured with communication parameters, such as static IP addresses, URLs or the like of the appropriate receiver 9 and server 3 so as to allow the control panel 14 to send the signals to both the receiver 9 and server 3 correctly. The control panel 14 is configured to send the signals to both the receiver 9 and server 3 substantially simultaneously, and may be auto-configured to do this as described below. In practice, the signals may be sent in sequential order, in which case the alarm signal is first sent to the receiver 9 and then subsequently sent to the operator server 3 on account of the receipt of the signal by the receiver 9 on time being more critical than that of the operator server 3. In embodiments, the control panel 14 may be configured to send a differing types of signals to the receiver and/or server 3. For example, the control panel 14 may be configured with a set of first signals which are to be sent to both the receiver 9 and the operator server 3 simultaneously, a second set of signals which are to be sent only to the receiver 9, and a third set of signals which are to be sent only to the operator server 3.

In this instance two alarm signals are sent to two locations (CMS receiver 9 and operator server 3) direct from the control panel 14. The advantages of this include:

Minimizing delays. "Clearing houses" can add significant delays—particularly when forwarding alarms to POTS receivers.

Transparency. Alarms received at CMS 2 are sent directly from control panel 14 with no data mapping in between.

Prioritizing traffic. Rather than sending all data (high or low priority) over one link, the foregoing method ensures that alarms are treated with higher priority.

Full end to end polling. By ensuring alarms come direct from the control panel 14, the method ensures end-to-end polling/connectivity. This is significant (and in some cases mandatory) to be certain there are no "artificial" generation of alarms from outsiders.

ii. Smash and Grab Alarm

The above-described dual-path signaling can be extended to provide an effective "smash and grab alarm." Intruders may physically smash and/or remove alarm control panel 14, interfere with the communication interface 27, or simply pull the power supply. Furthermore, the intruder may interfere with the power supply of the control panel 14 so as to depower the control panel 14 prior to the control panel 14 being able to send the alarm signal to the receiver 9 of the CMS 2. To avoid this, the control panel 14 is configured to send a "dual path" provisional alarm signal, including one signal sent to the CMS 2 and one to the network operator 8. The network operator 8 monitors the status of the control panel 14 and, should it be disabled, is adapted to send a secondary alarm signal to the CMS 2. More specifically, as alluded to above in the background section, to prevent or reduce false alarms, conventional alarm control panels 14 are adapted to wait a predetermined delay prior to sending an alarm signal to CMS 2. For example, upon detecting the opening of a front door of a premises, the alarm control panel 14 may be adapted to wait a predetermined amount of time, such as a 3 minute time period, prior to sending an alarm signal to the CMS 2. In this manner, should the homeowner open the front door, the homeowner may have 3 minutes in which to disable the alarm control panel 14, such as by inputting a secret code. If the secret code is not input in this timeframe, the control panel 14 is adapted to send an alarm signal to the receiver 9 of the CMS 2. However, in the event of the control panel 14 being intentionally disabled by an intruder, the control panel 14 wouldn't be able to send the alarm signal to the CMS 2 for action. To address this problem, the control panel 14 is adapted to send a "dual path" provisional alarm signal to both the CMS 2 and network operator server 3 substantially simultaneously. In this way, network operator server 3 is adapted to monitor the status of the control panel 14 and, should the control panel 14 be disabled by an intruder, the network operator server 3 is adapted to send a secondary alarm signal to the CMS 2. To accomplish this, the firmware/software of the control panel 14 is configured with respective addresses of the receiver 9 of the CMS 2 and the operator server 3 on the network operator domain 8. Such configuration may be by way of status IP address, URL or the like. Furthermore, the control panel 14 is configured so as to send a provisional alarm signal to both the receiver 9 and network operator server 3 substantially simultaneously upon receipt of sensor signals from the sensors 13. Furthermore, the control panel 14 is configured with a predetermined delay (such as 3 minutes) wherein, after the sending of the provisional alarm signal, the control panel 14 is adapted to send a real alarm signal to the receiver 9 if the control panel is not deactivated by the homeowner within the predetermined delay. For example, when a homeowner returns home, the homeowner may open the front door such that the control panel 14 receives a front door opening signal from the front door sensor 13. The control panel 14 then sends a provisional alarm signal to both the CMS receiver 9 and the network operator server 3. The control panel then starts a timer to count the elapsed time since the sending of the provisional alarm system. Should the control panel 14 be deactivated by the homeowner within the predetermined time period, then the control panel 14 is adapted to deactivate and stop the timer. However, if the control panel 14 is not deactivated by the homeowner within the predetermined time period, then control panel 14 sends a real alarm signal to the receiver 9. Here the control panel 14 provides a redundant secondary alarm signal to the CMS receiver 9 in case the control panel 14 becomes disabled by an intruder.

Figure 3:
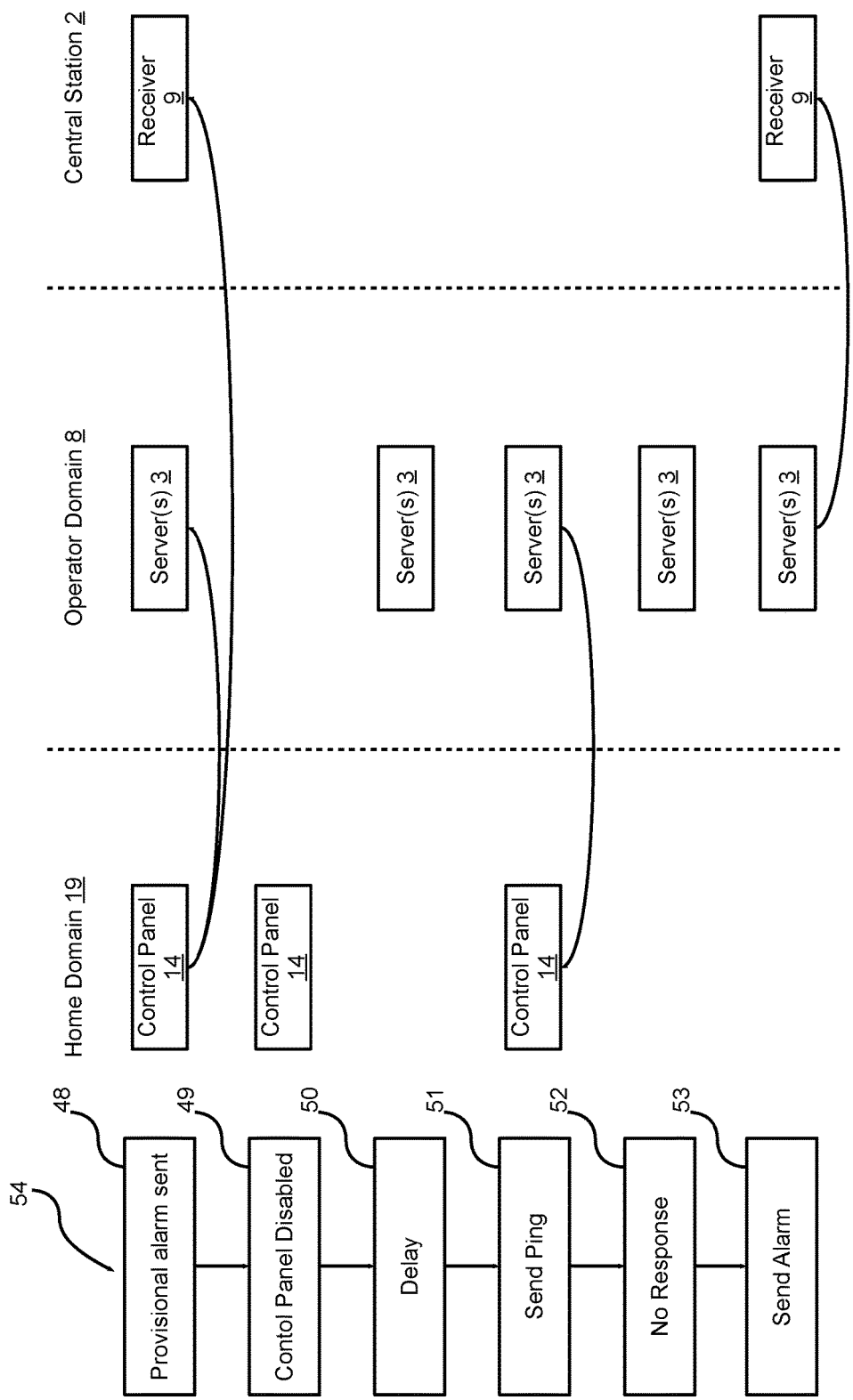
FIG. 3 shows an interaction diagram representing alarm signal delivery monitoring during alarm control panel disablement events in accordance with an embodiment of the present disclosure.

Referring to FIG. 3, there is shown an interaction diagram showing the interaction between the control panel 14, operator server 3 and CMS receiver 9. Specifically, the interaction diagram shows the steps of the method 54 for sending the secondary alarm signal. Each step of the method 54 corresponds horizontally with the operations of the respective actors, being the control panel 14, network operator server 3 and CMS receiver 9. Now, at step 48 of method 54, the control panel 14 is adapted to detect an alarm event from one of the sensors 13 and send a provisional alarm signal to both the operator server 3 and the CMS receiver 9. In this manner, the processor 34 of the operator server 3 is adapted to receive, via the data interface, the provisional alarm data representing the provisional alarm.

Now, at step 49, the control panel 14 is disabled by the intruder. As alluded to above, the control panel 14 may be disabled by physically smashing and removing the control panel 14, interfering with the communication interface 15 or power supply of the control panel 14.

As such, and as will be described now in further detail, the operator server 3 is adapted to monitor the status of the alarm control panel 14 so as to ascertain if the alarm control panel 14 has been disabled. If so, the operator server 3 may be adapted to send a secondary alarm signal to the CMS receiver 9 as will be described in further detail below.

In one embodiment, as is shown in the FIG. 3, at step 50 the operator server 3, having received the provisional alarm signal, is adapted to delay for a predetermined period. Specifically, the operator server 3 may itself implement a timer to measure the elapsed time since the receipt of the provisional alarm signal. Upon the expiration of the delay for the predetermined period, at step 51 of method 54, the operator server 3 is adapted to ping the control panel 14.

However, because the alarm control panel has been disabled, the alarm control panel 14 is unable to respond to the ping of the operator server 3. As such, at step 52, the operator server 3 ascertains that no responses been received from the control panel 14.

As such, at step 53, the operator server 3 is configured to send a secondary alarm signal to the receiver 9.

It is important to note that the foregoing method is not simply a backup communication of alarm signals which would inherently require an intermediary "clearing house" to manage the redundancy. In this instance two alarm signals are sent to two locations (CMS receiver 9 and operator server 3) direct from the control panel 14. The advantages of this include:

Minimizing delays. "Clearing houses" can add significant delays—particularly when forwarding alarms to POTS receivers.

Transparency. Alarms received at CMS 2 are sent directly from control panel 14 with no data mapping in between.

Prioritizing traffic. Rather than sending all data (high or low priority) over one link, the foregoing method ensures that alarms are treated with higher priority.

Full end to end polling. By ensuring alarms come direct from the control panel 14, the method ensures end-to-end polling/connectivity. This is significant (and in some cases mandatory) to be certain there are no "artificial" generation of alarms from outsiders.

iii. Alarm Control Panel Signal Transportation Management

Given the "dual path" alarm signal described above, a scheme for dual-path alarm signal transportation management is also disclosed to provide for situations where signals are not received by the CMS receiver 9.

Figure 6:
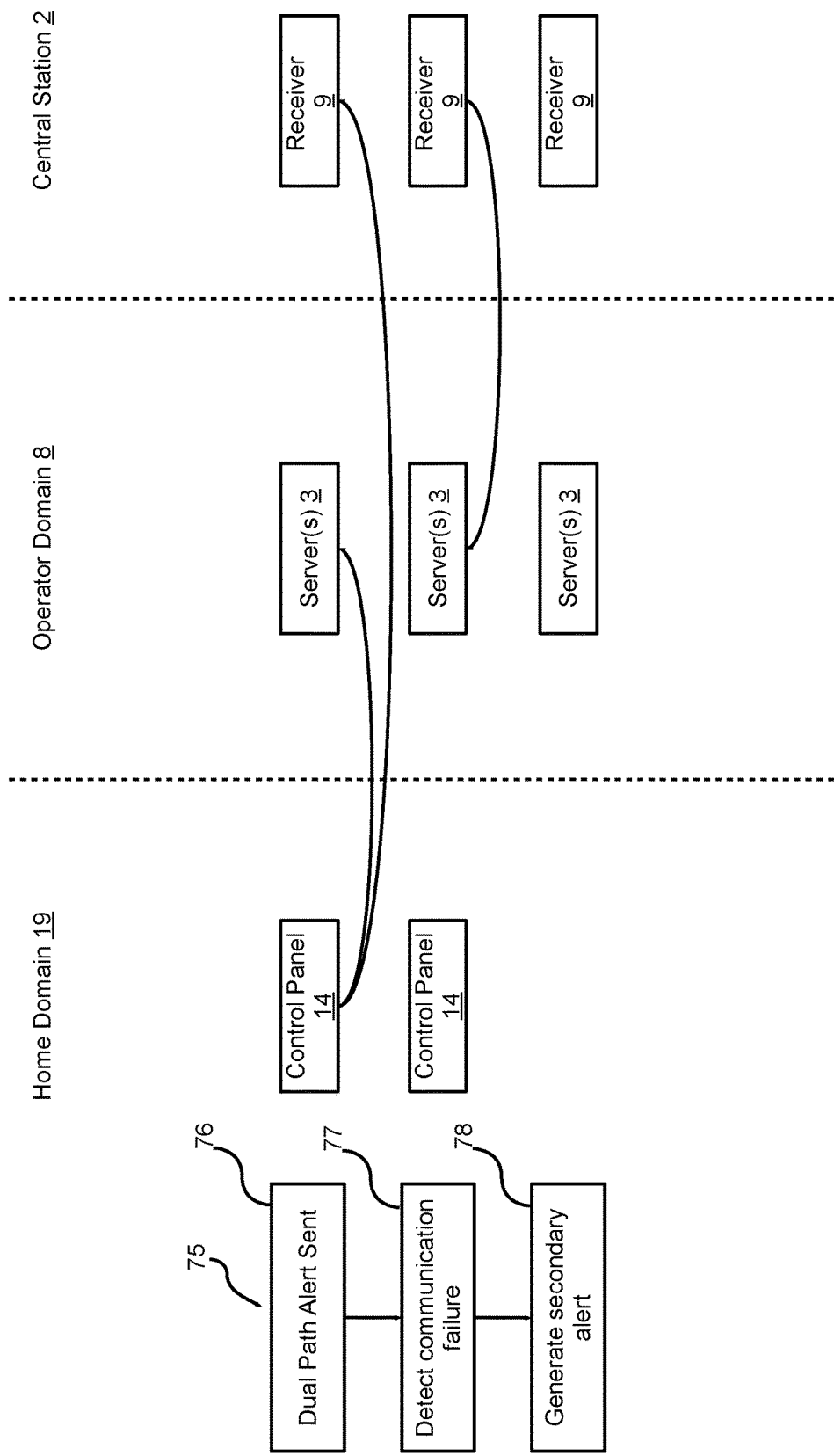
FIG. 6 shows an interaction diagram representing alarm control panel signal transportation management in accordance with an embodiment of the present disclosure.

Now, referring to FIG. 6, there is shown an interaction diagram for dual path alarm signal transportation management. The diagram comprises a method 75 for signal transportation management, wherein each step of the method 75 corresponds horizontally with an interaction representation of the various actors on the system 1.

Now, the control panel 14 is configured during installation to send alarm and other signals to both the receiver 9 and the operator server 3. Specifically, the firmware/software and/or configuration settings of the control panel 14 may be provided with communication settings identifying the receiver 9 and the operator server 3.

As such, at step 76 of method 75, the alarm control panel 14 sends an alarm signal to both the receiver 9 and the operator server 3.

Now, at step 77, the operator server 3 is configured to detect a communication failure between the control panel 14 and the receiver 9.

In one embodiment, the operator server 3 is configured to establish a data connection with the receiver 9 and/or any other components of the CMS 2, such as a CMS server 11. Such communication may be established by way of the exposing of an API or the like by the receiver 9 and/or CMS server 11.

As such, in this embodiment, the operator server 3 may detect whether the signal has been received by the receiver 9. For example, this is possible using a Persistent Domain Monitoring scheme as described below in section (iii). Alternatively, for each signal sent by the control panel 14 to the operator server 3, the operator server 3 may confirm that the same signal has been received by the receiver 9 such as by requesting, from the appropriate API or the like, whether the signal has been received by the CMS 2.

There are different ways in which the operator server 3 may ascertain that the same signal has been received by the receiver 9. In one, the operator server 3 may deduce that the signal has been transported correctly if a signal is received at the receiver 9 from the control panel 14 at a time substantially coincident with the time the signal is received by the operator server 3. In other embodiments, the signal type, such is represented by a single code of the like, may be compared by the operator server 3. In other embodiments, each communication may be provided with a unique ID by the control panel 14, or a hash calculated for each signal, such that the unique ID or hash may be compared by the operator server 3.

In a further embodiments, as opposed to the operator server 3 having to establish a connection with the receiver 9, the receiver 9 may be configured to send an acknowledgement signal to the operator server 3.

In this manner, the receiver 9 and/or the CMS server 11 may be configured with communication settings, such as the IP address of the operator server 3.

As such, upon receipt of a signal from the alarm control panel 14, the receiver 9 and/or CMS server 11 may send an acknowledgement signal to the operator server 3. If the operator server 3 does not receive the acknowledgement signal within a predetermined time period after having received the signal from the control panel 14, the operator server 3 may detect that the signal has not been correctly received by the receiver 9.

Where the receiver 9 is configured to receive signals from a plurality of control panels 14 relating to a plurality of providers, the receiver 9 and/or the CMS server 11 may ascertain the appropriate network operator server 3 to which to send the acknowledgement signal.

In a yet further embodiment, and especially when no communication between the receiver 9 and/or the server 11 and the operator server 3 is possible, the receiver 9 may be configured to rather send an acknowledgement signal back to the control panel 14 wherein the control panel 14 is configured to forward the acknowledgement signal to the operator server 3.

In this way, should the operator server 3 not receive the forwarded acknowledgement signal from the control panel 14, the operator server 3 may ascertain that the receiver 9 has not received the original signal from the control panel 14. Upon detecting that a signal has not been received by the receiver 9, the operator server 3 may take appropriate action.

In one embodiment, the operator server 3 may instruct the control panel 14 to resend the signal. The resending of the signal may account for transient network interruptions and the like. In a further embodiment, the operator server 3 may generate a secondary signal, representing the original signal sent from the control panel 14 and send the secondary signal to the receiver 9. In this manner, the receiver 9 is configured to receive the signal as if it were received from the control panel 14 in the first place. In a further embodiment, including after having instructed the control panel 14 to resend the signal, perhaps multiple times, at step 78, the operator server 3 may send an alert to instigate action. For example, an alert may be sends to another CMS 2, or a nominated individual client computing device, such as the homeowner, network operations representative or the like. In embodiments, so as to prevent the dual path signals from not being received by both the operator server 3 and the receiver 9, such as due to an outage of the Internet 21, in use, the control panel 14 may be configured to utilize differing communication paths of the access domain 26.

For example, the control panel 14 may be configured to send the signal to the receiver 9 across the Internet 21 and across the cellular network 20 to the operator server 3. In this manner, the failure of the Internet 21 will not prevent the signal from being received by the operator server 3.

iii. Persistent Domain Monitoring

All of the domains of FIG. 1 may from time to time experience outages, periods of downtime, etc. In this case, alarm and other signals may not be received by the CMS 2 receiver 9, or control panel 14, or operator server 3. In accordance with a further embodiment of the present disclosure, there will now be described several variations of a self-monitoring process.

Specifically, turning now to FIG. 1, the control panel 14 is configured to send signals to a CMS 2 receiver 9. The present invention monitors the CMS 2 so as to detect periods of network interruption or receiver 9 unavailability. Specifically, the operator server 3 is configured to continuously monitor the receiver 9 so as to detect if the receiver 9 becomes unavailable, either because of a network disconnection or alternatively wherein the receiver 9 becomes unavailable. This is accomplished by transmitting a "heartbeat" signal from the receiver 9 to the operator server 3. As such, if the heartbeat signal is interrupted, the operator server 3 may ascertain that the receiver 9 is no longer available to receive signals from the control panel 14.

The receiver 9 may be configured to periodically send heartbeat signals to the operator server 3 by configuring it with a network connection state monitoring tool (e.g., a "ping monitor") for automatic checking of connections to network hosts. A variety of conventional ping monitors exist which provide IP-based connection statistics info, including uptime, outages, failed pings, etc. In this case, the receiver 9 ping monitor is programmed with communication settings, such as a static IP address, URL or the like of the operator server 3 so as to be able to send the heartbeat signals to the operator server 3. The receiver 9 ping monitor is preferably programmed so as to be able to send the heartbeat signals to the operator server 3 via a persistent always-on connection via router 18 over a homeowner's cable internet service, but may alternately or redundantly broadcast pings via GSM transceiver 17 over a cellular network. In alternative embodiments, the operator server 3 may be configured to periodically ping the receiver 9, such as by utilizing a dynamic or static IP address, URL and the like of the receiver 9. Now, upon detecting the unavailability of the receiver 9, the operator server 3 may take appropriate action.

In one embodiment, the operator server 3 may send an alert, such as to a client computing device, such as the operator client computing device 23 or homeowner client computing device 22. In this embodiment, the operator server 3 may determine the appropriate client computing device to wish to send the alert in accordance with the particular receiver 9. In other embodiments, the operator server 3 may be configured to send an instruction to the control panel 14 instructing the control panel 14 to send signals to another available receiver 9.

In an alternative embodiment, as opposed to the operator server 3 sending a ping to the control panel 14, the control panel 14 is configured to send a continuous periodic "heart beat signal". The operator server 3 is be configured to listen to the heartbeat signal from the control panel 14. In this manner, should the heartbeat cease past the receipt of a provisional alarm signal, the operator server 3 may send the secondary alarm signal to the receiver 9.

In alternative embodiments, the control panel 40 may be configured to send a selective heartbeat signal after having sent the provisional alarm signal, and to terminate the heartbeat signal upon deactivation of the control panel 14 or the sending of the real alarm signal. Should the homeowner successfully deactivate the alarm control panel 14, the alarm control panel 14 may be configured to send a deactivation signal to the operator server 3 such that the operator server 3 stops the timer and stands by.

In embodiments, so as to account for inadvertent dropped packets and the like on account of an unreliable network connection the operator server 3 may be configured to send multiple pings to the control panel 14. As can be appreciated, the operator server 3 may be configured with a delay greater than the configured delay of the control panel 14 such that the operator server 3 doesn't send the secondary alarm signal prior to the expiration of the time out for disablement of the control panel 14.

iv. Relayed Operator 3-to-CMS 2 Signaling

In accordance with the further embodiment of the present invention, there will now be described a method of signaling the receiver 9 at the CMS domain 2 wherein the control panel 14 is used as a communications relay between the operator server 3 and the receiver 9. Currently, a receiver 9 must be set up on site at the CMS domain 2 to receive alarms for each control panel 14. This is a relatively simple procedure and can be complete within days. However, it only provides a one-way communication path from an alarm control panel 14 to the CMS 2. It does not provide a communication path from operator server 3 to the CMS 2. With conventional integrated security networks there is generally no communication capabilities between the operator server 3 and the receiver 9. Of course, an additional back-end communication path by other means can be installed, but this requires integration such as by the implementation of application programming interfaces (APIs) and the like, which takes time and money to complete. Moreover, such configuration may not always be possible, especially on account of security considerations. Furthermore, such configuration may not be uniformly possible across all CMS operators 10. As seen in FIG. 1, the operator server 3 is already in bi-directional communication with the control panels 14 and the control panels 14 are in bi-directional communication with the CMS 2. The present invention configures operator server 3 to send commands indirectly to the CMS 2 via the control panel 14, and configures the control panel 14 to relay them to the CMS 2. This approach is useful for relaying certain administrative commands other than operational panel state (alarms, open/close, online/offline, etc). Examples of administrative commands include account management (creation, activate, suspend, deactivate), placing on/off test, adding users (pass code, name, phone), uploading panel phone number for two way voice.

Figure 5:
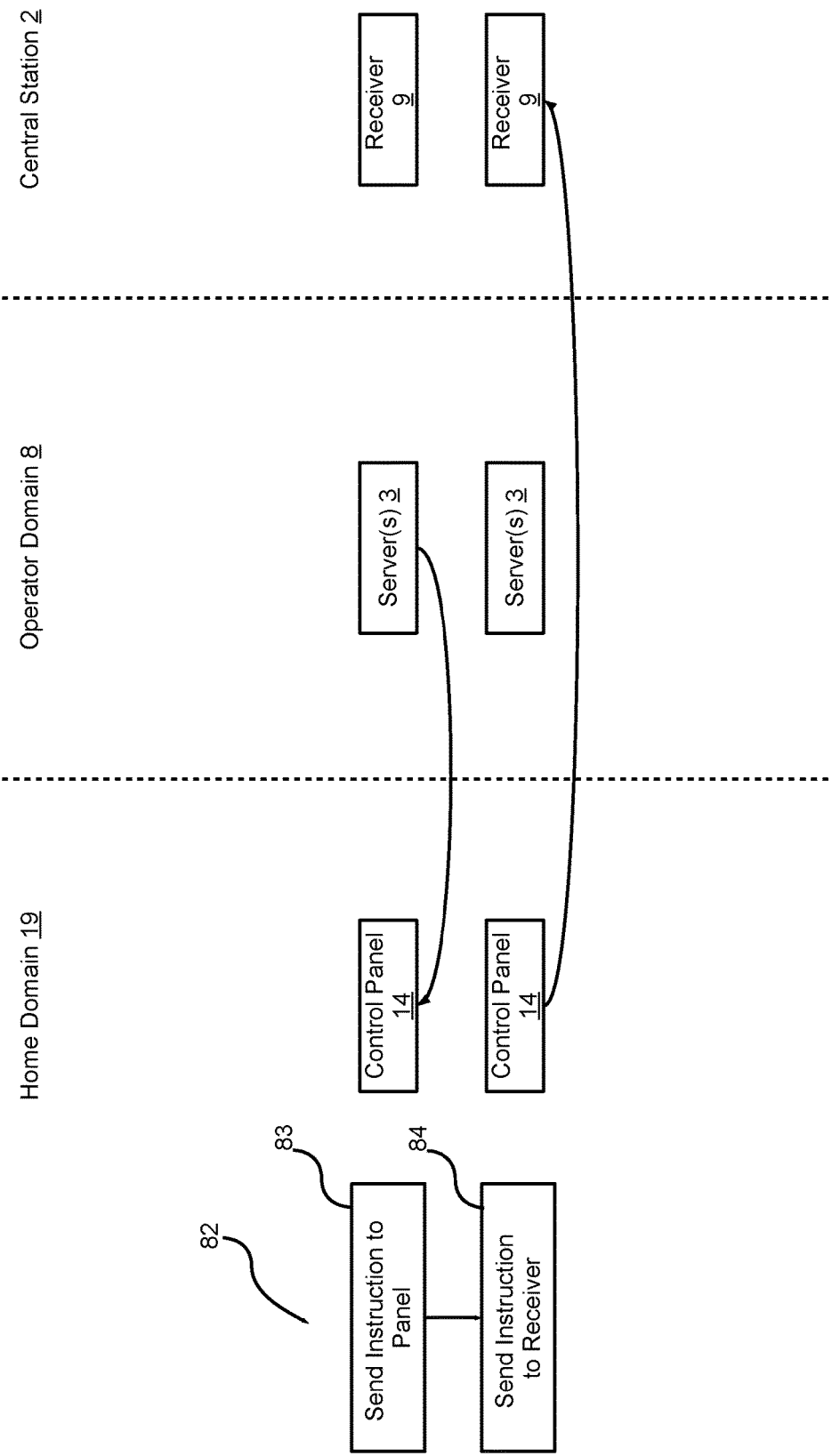
FIG. 5 shows an interaction diagram representing signalling a central station receiver in accordance with an embodiment of the present disclosure.

Specifically, turning to FIG. 5, there is shown an interaction diagram showing a method 82 for signaling the CMS receiver 9.

The method starts at step 83 wherein the operator server 3 sends a signal to the alarm control panel 14. For example, the network operator may wish to enable an account of an account holder at the CMS 2. As such, and on account of being unable to communicate directly with the receiver 9, the operator server 3 is configured to rather send the signal to the control panel 14 for forwarding to the receiver 9. In networks 1 comprising multiple control panels 14 reporting with multiple receivers 9, the operator server 3 may be configured to ascertain the appropriate control panel 14 with which to communicate with a particular receiver 9 such as by utilizing user account information and the like.

As such, at step 84, the control panel 14 is configured to forward the signal to the receiver 9 for implementation.

Specifically, the firmware/software and/or configuration settings of the control panel 14 may be configured to forward such signals to the receiver 9 upon receipt from the operator server 3. In this manner, the configuration settings may specify the identity of the operator server 3 (such as by way of a static IP address, URL or the like) from which authorized signals may be received, and the identity of the receiver 9 to which to forward the instructions.

In embodiments, allowances are made for receipt of an acknowledgement by the operator server 3 to ascertain that the signal has been received correctly by the receiver 9. Specifically, in this embodiment, the receiver 9 is configured to send an acknowledgement signal back to the control panel 14 signifying the successful receipt of the signal from the control panel 14. In this manner, the control panel 14 is further configured to forward the acknowledgement signal back to the operator server 3. In the event that the operator server 3 does not receive an acknowledgement signal, the operator server 3 may retry the instruction, or take other appropriate action.

In embodiments, as opposed to the control panel 14 always forwarding the instruction to the same receiver 9, the signal received from the operator server 3 may contain the identity of the receiver 9 to which the control panel 14 must forward the signal. Such identity may be encoded in the signal by way of a static IP address, URL or the like. If needed, the control panel 14 is preferably configured to implement translations so as to be able to send signals to the receiver 9 in the appropriate format. For example, in the embodiment where the operator server 3 sends an account activation instruction to the control panel 14, upon receipt of the account activation instruction by the control panel 14, the control panel 14 may enable certain functionality of the control panel 14 and simultaneously send a translated account registration instruction to the receiver 9, wherein, for example, the registration instruction may comprise the unique ID of the control panel 14.

In a further embodiment, the control panel 14 may be configured with allowable instructions/codes representing only those instructions/codes which may be forwarded by the control panel 14 to the receiver 9.

B. Video Enhancements i. P2P Handoff

The foregoing hardware and software architecture facilitates several improvements for enhanced video data networking in the integrated security network 1. Specifically, referring to FIG. 1, in accordance with conventional security systems, homeowners, utilizing one or more homeowner client computing devices 22 may view security video footage recorded by one or more IP cameras 28 associated with the respective homeowner's security account.

Conventional systems allow homeowners to authenticate with a central server so as to allow for the retrieval of IP security footage data only by those authorized and authenticated homeowners. However, a disadvantage of utilizing such an intermediary central server relay architecture is network delays, resulting in jitter and therefore increased reliance on buffering and the like when viewing security footage. Other conventional systems may allow homeowners to connect directly with an IP camera 28 for the purposes of viewing recorded security footage. However, the disadvantage of such is lack of security wherein, for example, unauthorized persons may access a camera and view IP footage in an unauthorized manner. In this regard, it should be noted that IP cameras generally comprise fewer security features and options as compared to a central server especially wherein the central server is configured for monitoring homeowner user accounts and other information which may be utilized for the purposes of allowing proper authentication of appropriate homeowners.

As such, and as will be described in further detail below, there is provided a hybrid security video data retrieval model comprising a first client-server stage wherein the homeowner authenticates with the operator server 3 using a homeowner client computing device 22 and a handoff to a subsequent peer-to-peer stage wherein the operator server 3 creates a peer-to-peer connection directly between the homeowner client computing device 22 and the appropriate IP camera 28. As such, on account of the homeowner client computing device 22 receiving data directly from the appropriate IP camera 28, network delays which would otherwise have been introduced by the operator server 3 may be avoided or substantially reduced.

Referring back to the security system 1 of FIG. 1, the system 1 comprises a plurality of home domains 19 associated with respective homeowners. The database 5 may comprise account information relating to each respective homeowner. As such, in use, the control panel 14 and/or the video management server 27 is configured to communicate with the operator server 3 such that the operator server 3 is configured to ascertain the installed IP cameras 28 within the home domain 19. For example, the operator server 3 may ascertain that the home domain 19 comprises 5 installed cameras. Furthermore, the operator server 3 may receive video data from the IP cameras 28, either at periodic interval or in substantial real-time utilizing video streaming.

In embodiments, IP tunneling may be utilized for the purposes of receiving video data via the Internet 21 IP network.

Now, the homeowner of the home domain 19, utilizing homeowner client computing device 22 may authenticate with the operator server 3 for the purposes of viewing IP footage from the one or more IP cameras 28.

Specifically, the homeowner may authenticate with the operator server 3, view the available cameras 28, and select one of the cameras 28 so as to be able to view, in substantial real-time, the live video feed from the selected camera 28. It should be noted that, in additional or alternative embodiments, archived video footage data may be provided to the homeowner, such as archived video footage data stored by the video management server 27.

As alluded to above, the homeowner client computing device 22 may interface with the operator server 3 in differing manners. In a first manner, the operator server 3 may comprise a web server configured to allow the homeowner client computing device 22 to interact with the operator server 3 utilizing a conventional Web browser application. In this manner, using the Web browser application, the homeowner may input authentication credentials and, once having been successfully authenticated by the operator server 3, view the available video feeds from the one or more IP cameras 28. In embodiments, the web rather may display the received video data stream or alternatively redirect the homeowner client computing device 22 to an appropriate streaming video rendering application.

In alternative embodiments, as opposed to utilizing a web browser application, the homeowner client computing device in 22 may interact with the operator server 3 in differing manners, such as by utilizing a customized software application configured to receive stream video data from the operator server 3 for display.

Figure 4:
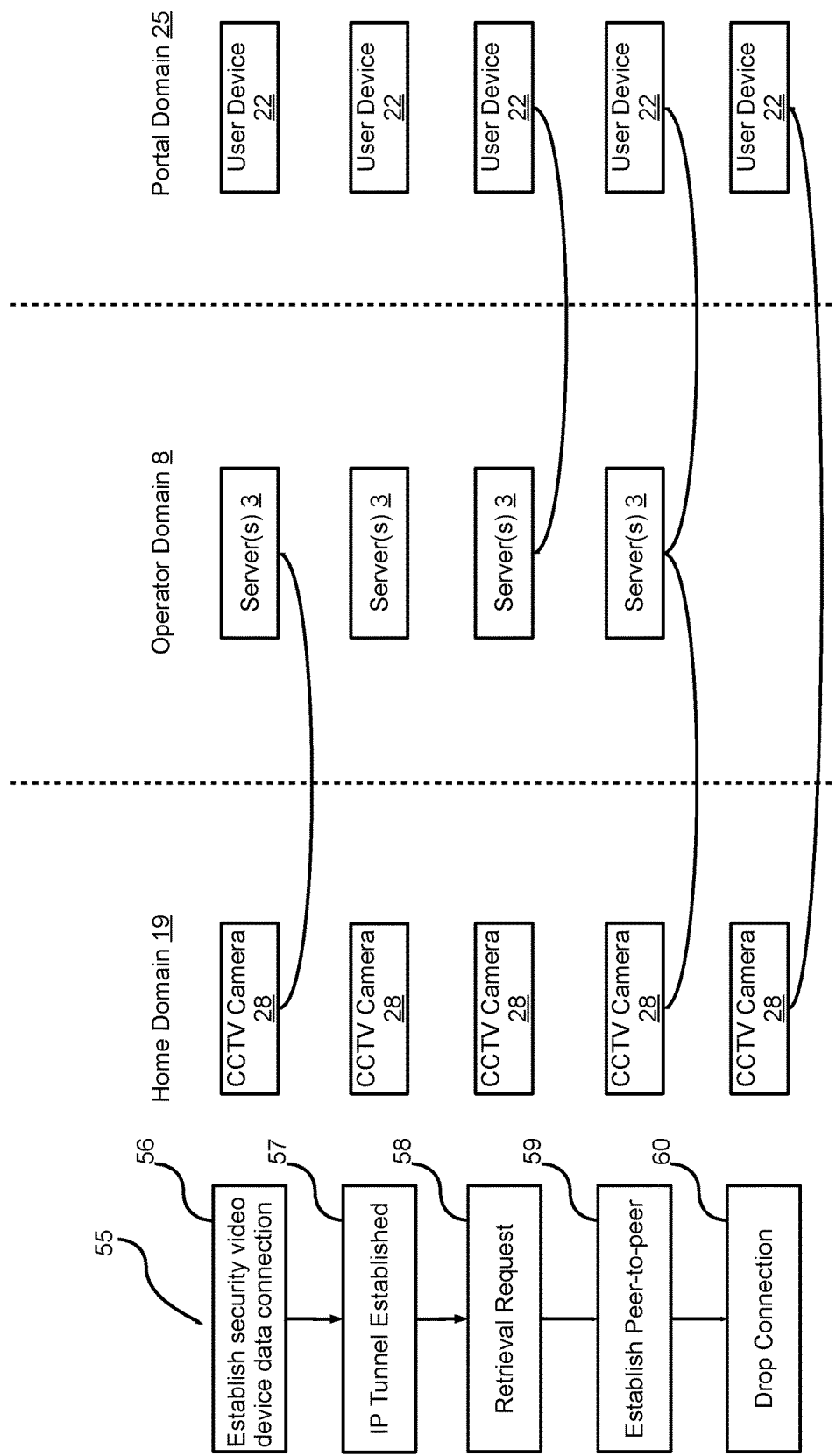
FIG. 4 shows an interaction diagram representing video data networking in an integrated security network in accordance with an embodiment of the present disclosure.

Now, turning to FIG. 4, there is shown an interaction diagram showing the functions performed by the IP camera 28, operator server 3 and homeowner client computing device 22 for security video data retrieval. The interaction diagram shows a method 55 for security video data retrieval wherein each step of the method 55 is horizontally associated with an exemplary interaction between various actors of the system 1, being, in this case, the IP camera 28, server 3 and homeowner/end user client computing device 22. In this description, the term "video device" includes the control panel 14, video management server 27, IP camera 28 and other like devices.

As such, the method 55 starts at step 56 wherein the operator server 3 establishes a video device data connection. Specifically, the firmware/software of the video cameras 28 may be configured with an IP address or the like of the operator server 3 so as to authenticate with the operator server 3.

As alluded to above, the operator server 3 may be configured to ascertain the installed IP cameras 28 within the home domain 19 by making appropriate queries to the control panel 14 video management server 27. However, in other embodiments, the control panel 14 of the video management server 27 may be configured with information relating to the number, type and the like of the installed IP cameras for the purposes of conveying such information to the operator server 3. Alternatively, the operator server 3 may be configured with such information by the homeowner, security installation consultant, or the like.

As alluded to above, in embodiments, the operator server 3 may be configured to receive IP video footage data from the video camera 28. For the purposes of conveying such video footage data to the operator server 3, at step 57 of method 55, an IP tunnel may be established between the video camera 28 for the purposes of encapsulating the video data for transmission across the WAN 21 IP network.

Now, a homeowner may wish to view the IP footage from one or more IP cameras 28 from the homeowner's home domain 19. As such, utilizing homeowner client computing device 22, such as a personal computing device, mobile communication device or the like, the homeowner may authenticate with the operator server 3.

Having authenticated successfully, the operator server 3 may be configured to present a list of video feeds to the homeowner via the homeowner client computing device 22 for selection, each video feed corresponding to a respective IP camera 28.

Such a list may comprise camera identification information, such as the name and location of each respective camera. Additionally, image data or down-sampled video data may be provided for the purposes of previewing each respective video feed.

As such, the homeowner may select at least one of the IP cameras 28 for the purposes of viewing the IP footage. As alluded to above, in a preferred embodiment, the operator server 3 may be configured so as to allow the homeowner to view IP footage in substantial real-time. However, it should be appreciated that archived video data may be provided also to the homeowner.

As such, at step 58 of method 55, the operator server 3 is configured to receive a security video data retrieval request from the homeowner representing a selection of at least one of the IP cameras 28 for viewing. For example, the homeowner may wish to view IP camera 28 number 3.

Now, as opposed to routing the video feed data via the operator server 3, at step 59 of method 55, the operator server 3 is configured to establish a peer-to-peer connection so as to operably connect IP camera 28 number 3 and the homeowner client computing device 22 directly so as to avoid network delays which may be introduced by the intermediary operator server 3 acting as a relay.

As such, at step 59 of method 55, the operator server 3 is configured to establish a peer-to-peer connection between the chosen IP camera 28 number 3 and the homeowner client computing device 22. For example, the operator server 3 may be configured to send the IP address of a chosen IP camera 28 to the homeowner client computing device 22 such that the homeowner client computing device 22 is able to instantiate the peer-to-peer connection using the received IP address. Once done, the homeowner client computing device 22 is configured to receive the video feed data directly from the IP camera 28.

In embodiments, as alluded to above, as opposed to the homeowner client computing device 22 establishing a peer-to-peer connection with a IP camera 28 end point, the homeowner client computing device 22 may additionally or alternatively establish a peer-to-peer connection with the video management server 27 or control panel 14. In such cases, the URL used by the homeowner client computing device 22 may specify the appropriate video feed for retrieval, such as by way of one or more URL parameters or the like. Such parameters may be utilized not only for the purposes of choosing the appropriate video feed but also the type of video feed, whether real-time or archived, and if archived, time period parameters and the like.

At step 60 of method 55, the operator server 3 may be configured to drop the IP tunnel connection with the video camera 28. Furthermore, the operator server 3 may additionally be configured to drop the connection to the homeowner client computing device 22.

ii. Archival

In addition to allowing homeowner client computing devices 22 to view security video footage recorded by one or more IP cameras 28 associated with the respective homeowner's security account, the present system 1 allows more efficient archiving and retrieval of video footage by dynamic generation of destination paths of a FTP URL. The dynamic generation of destination paths of a FTP URL for video footage data archiving will now be described.

Referring back to FIG. 1, IP cameras 28 (or other cameras) may be configured to transmit IP video data to the operator server 3 for storage within the database 5 and/or to the video management server 27. An example comprising uploading from IP cameras 28 is described. IP cameras 28 may utilize FTP for the purposes of uploading video data to the operator server 3. In this case, a dedicated secure FTP URL may be utilized by the IP cameras 28, for example:

ftp://userid:password@securenet.com/users/data/video/uploads

In this manner, it should be clear that all IP cameras 28 upload the video data files to the same upload folder. For the above FTP URL, the respective IP camera 28 will utilize the appropriate authentication credentials by providing the requisite user ID and password combination. Where each IP camera 28 has been assigned unique authentication credentials, the operator server 3 may identify the individual IP camera 28 or video management server 27. One skilled in the art will readily understand that the identity of the camera 28 may also be ascertained from network request parameters, such as IP address, Mac address and the like.

In other embodiments, unique FTP URLs may be provided to each IP camera 28. For example, a unique FTP URL for a camera having camera ID 1074891 may comprise:

ftp://userid:password@securenet.com/users/data/video/uploads?CID=1074891

Upon receipt of such video files, and having identified the appropriate camera 28 the operator server 3 catalogues the received video files. For example, the operator server 3 may be configured to catalogue the received video files by camera ID and timestamp. In other embodiment, other parameters may be utilized, such as user ID, and the like.

However, as alluded to above, conventional archiving processes are computationally expensive rendering the operator server 3 unable to serve a large number of IP cameras 28 and/or video management servers 27. Specifically, for the video files received and temporarily recorded to disk within the database 5, the operator server 3 would then have to subsequently retrieve the stored video data from the disk, and move the video files to the appropriate archival folder. For example, using the example above where the operator server 3 catalogues video data in accordance with camera ID and timestamp, the server would have to move the video files to the following video folder:

. . . /home/users/data/video/uploads/1074891/2015/07/22

The above exemplary path is the proper archival folder for video received from camera 28 having ID 1074891 and received on 22 Jul. 2015.

To alleviate the problems of the I/O bottlenecks created by moving video files for archival purposes from a number of IP cameras 28, the operator server 3 stores the received video data in the appropriate final archival folder immediately upon receipt from the appropriate video camera 28 so as to avoid the subsequent moving of the video file. In this manner, the operator server 3 is configured to receive video data from large numbers of IP cameras 28 without the above-mentioned I/O bottlenecks. To do this, upon receipt of the video data from the IP camera 28 the operator server 3 identifies the camera ID. As alluded to above, the camera ID may be identified in accordance with the authentication credentials of the FTP URL, network parameters such as IP address, Mac address and the like, URL parameters such as provided camera ID arguments and the like. In addition, the operator server 3 is preferably configured to utilize the internal system clock to additionally ascertain the upload date and time.

As such, the operator server 3 is configured to generate a destination path comprising the camera ID and the date time timestamp. For example, and as alluded to above, for video data received from camera 1074891 on 22 Jul. 2015, the operator server 3 may be configured to generate the following path:

. . . /home/users/data/video/uploads/1074891/2015/07/22

As such, the received video data may be stored directly to the generated path so as to avoid subsequent moving of the video data.

In this exemplary embodiment, the operator server 3 archives the video data in folders in accordance with camera ID and timestamp. However, other parameters may be equally applicable within the purposive scope of the embodiments described herein.

As can be appreciated, the following day the operator server 3 may be configured to generate a new path being:

. . . /home/users/data/video/uploads/1074891/2015/07/23

It should be appreciated that the IP camera 28 may be ignorant of the generated path and may simply upload the video data to the provided FTP URL:

ftp://userid:password@securenet.com/users/data/video/uploads

Now, for the retrieval of the video data from the database 5, the operator server 3 may be configured to provide the full path for the appropriate video file. For example, the following path may be provided to a client computing device for the retrieval of the appropriate video data therefrom:

ftp://userid:password@securenet.com/usersdata/video/uploads/1074891/2015/07/23

C. Method for the Distribution of Pre-Shared Keys (PSK)

Typically, a CMS 2 will employ a plurality of receivers 9 each having a primary and secondary identification number which is usually a telephone number or IP address that the local control panel 14 calls to transmit information to the CMS 2. A plurality of control panels 14 may use the same receiver 9, and it becomes necessary to authenticate control panels 14 to avoid several specific problems. A first problem relates to the inadvertent misconfiguration of the control panel 14 by the installer during installation. Specifically, the control panel 14 may be configured incorrectly such that the control panel 14 authenticates with and communicates with the incorrect receiver 9. In this manner, the correct receiver 9 may never receive alarm signals from the control panel 14, despite the fact that the control panel 14 appears to be working correctly. As such, in an emergency situation, such as during the detection of a home intrusion of the like, the control panel 14 may send an alarm signal to the incorrect receiver 9 wherein, the incorrect receiver 9 may be unable to take action on account of not recognizing the account associated with the control panel 14. Furthermore, control panels 14 may be cloned so as to spoof active connections with the CMS receiver 9. Yet further, control panels 14 provided by a first provider may be reconfigured in an unauthorized manner to operate with an unauthorized CMS receiver 9.

It is well-known to assign each control panel 14 a unique private ID to authenticate them when calling CMS 2. However, this does not prevent alarms from a control panel 14 from being mistakenly sent to a different user account at the proper receiver 9. It is also known to subscribe to a Dialed Number Identification Service (DNIS) that enables authorization of a connection attempt based on the number called. DNIS identifies the number that called the receiver 9. The DNIS concept has been extended beyond telecommunications to IP receivers, enabling identification of the device requesting an IP connection. The present invention makes use of IP-based DNIS and assigns a single shared private key to each control panel 14 and to its corresponding receiver 9.

Figure 7:
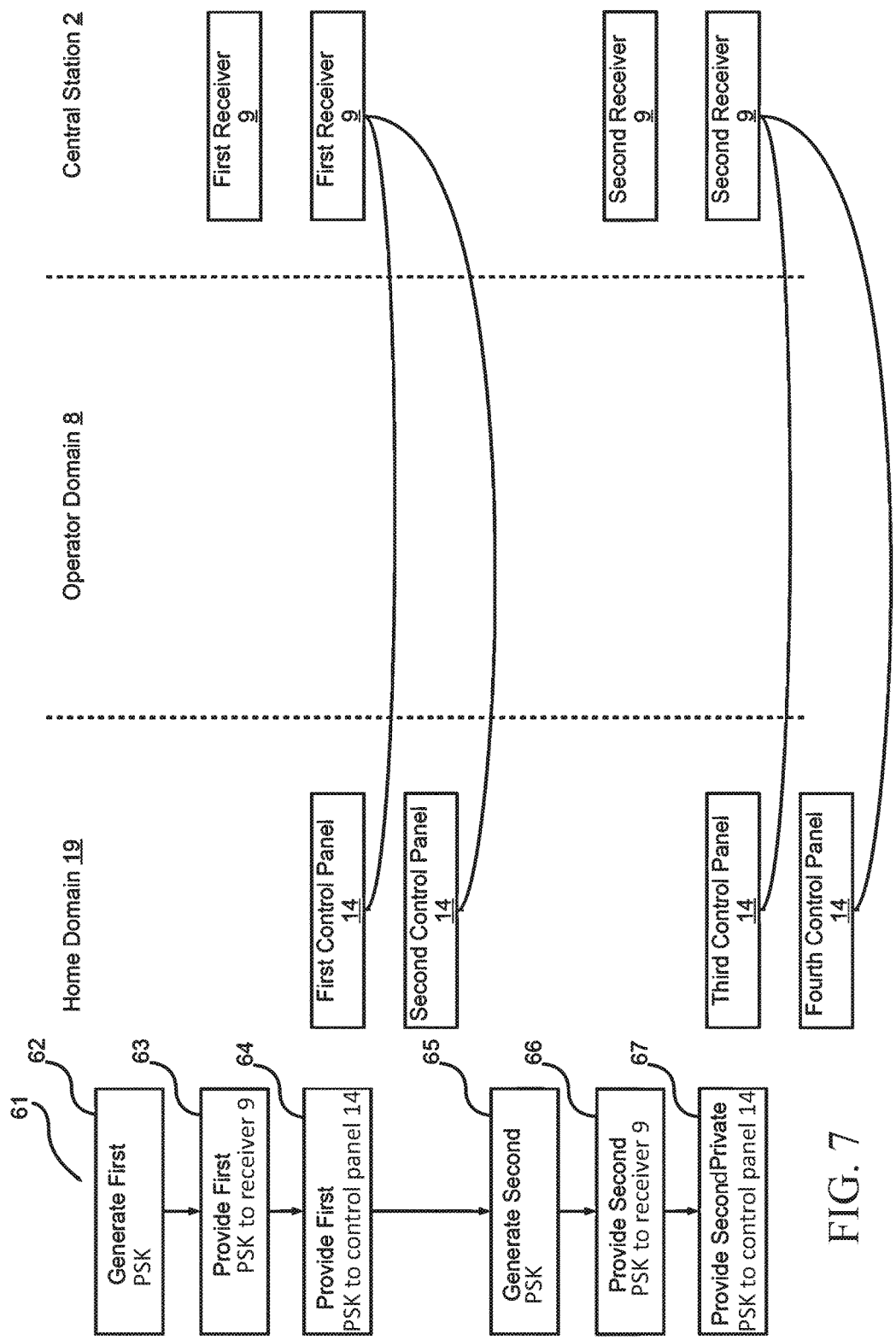
FIG. 7 shows an interaction diagram representing a method for the distribution of shared private keys (PSKs) across a security monitoring network in accordance with an embodiment of the present disclosure.

Toward this end, and with regard to FIG. 7, there is shown an embodiment of a method 61 for the distribution of shared private keys (PSKs) across the integrated security system 1. The PSK in practice, represents a shared secret between the control panel 14 and its receiver 9 that is used to maintain a private information link. This way the receiver 9 that receives an alarm signal (or any other message) can use its PSK to authenticate that the message originated from the control panel 14 holding the shared PSK. For present purposes, PSKs are uniquely assigned to CMS receivers 9 at configuration, and the shared PSKs are provided to the corresponding control panel(s) 14. In addition, each receiver 9 has a pre-designated host address (comprising Host/IP address and port number(s), and one or more port(s). Each port is always associated with the IP address of the host receiver 9, and thus completes the destination or origination address of a communication session. A port is identified for each IP address by a 16-bit number, commonly known as the port number. For purposes of the present invention, each receiver 9 is pre-configured with unique PSK associated with the DNIS. Each authorized control panel 14 is pre-configured with the matching PSK and the pre-assigned host address (Host/IP and port) of the receiver 9. Thus, the control panel 14 can only establish communications with a receiver 9 if its matching PSK and pre-assigned host address match that of the host receiver 9.

In this manner, the control panel 14 cannot communicate with the incorrect receiver 9 because the control panel 14 does not possess the correct matching shared-PSK and pre-assigned host address corresponding to those of the incorrect receiver 9.

Furthermore, the control panel 14 cannot spoof an active connection with the receiver 9 because the control panel 14 does not possess the correct shared-PSK and pre-assigned host address for the receiver 9.

Furthermore, the control panel 14 cannot be reconfigured to operate with a receiver 9 of an unauthorized provider because the control panel 14 does not possess the shared PSK and pre-assigned host address for the unauthorized receiver 9.

Now, the method 61 starts at step 62 where first shared PSK is generated.

At step 63, the first PSK is provided to a first receiver 9. The PSK is furthermore not provided to any other receiver 9 and as such, the PSK is unique to the first receiver 9.

At step 64, the first shared PSK is provided to a first control panel 14 and a second control panel 14. The first control panel and the second control panel are the control panels which are supposed to communicate with the first receiver 9. As such, the first control panel 14 and the second control panel 14 are provided with the correct shared PSK so as to allow for communication between the first and second control panels 14 and the first receiver 9.

Now, at step 65, a second shared PSK is generated.

At step 66, the second PSK is provided to a second receiver 9. Similarly, the second PSK is provided to no other receiver such that the second PSK is uniquely allocated to the second receiver 9.

At step 67, the second shared-PSK is provided to third and fourth control panels 14. The third and fourth control panels are the control panels 14 which are supposed to communicate with the second receiver 9. As such, by providing the second shared-PSK, the third and fourth control panels 14 are able to communicate with the second receiver 9.

As can be appreciated, the first and second control panels 14 cannot communicate with the second receiver because they possess the second shared PSK compatible with that of the second receiver. Similarly, neither can the third and fourth control panels 14 communicate with the first receiver 9.

In an alternate embodiment each receiver dynamically manages multiple DNISs. In this embodiment, each receiver 9 is configured with one or more unique pre-shared-key(s) (PSK) per DNIS and stores these PSK(s) in a lookup table.

Each control panel 14 is pre-configured with a matching PSK and address (Host/IP and port) of the receiver 9.

Each control panel 14 can only establish communications with a receiver if its PSK matches any PSK in the receiver 9 lookup table.

With communications established each control panel 14 will send an alarm payload that includes DNIS, Account ID and a checksum.

The receiver 9 validates the DNIS by matching the shared private key used and DNIS sent in the alarm payload. If the DNIS sent in the alarm payload matches the DNIS in the PSK/DNIS lookup table, the alarm will be accepted. Otherwise, it will be rejected.

This prevents control panels 14 from sending alarms to the wrong receiver 9 and also to the wrong DNIS. This embodiment is dynamic, so a single receiver 9 can now manage multiple DNIS'.

In yet another embodiment each receiver 9 dynamically manages individual Accounts/control panels 14. This is an extension to the second embodiment, instead of being limited to having unique PSKs per DNIS, each receiver may have unique PSKs per control panel 14. This way, the receiver 9 can prevent a control panel 14 from sending alarms to not only the wrong receiver and DNIS, but also the wrong Account ID. To implement this the receiver 9 lookup table will include matching PSK, DNIS and Account IDs.

With both dynamic embodiments each receiver 9 may synchronize PSKs in its lookup table regularly with the operator server so that new Account IDs brought online can communicate with the designated receiver 9 with minimal delay. This last embodiment is the ideal scenario for the prevention of intentional/un-intentional alarm delivery to wrong accounts.

D. Registration Server for the Provision of Alarm Control Panel Configuration Settings Now, in accordance with a yet further embodiment of the present disclosure, and, with reference to FIG. 1, there will now be described a registration server for the provision of alarm control panel configuration settings for the automated provision of alarm control panel configuration settings.

Specifically, in conventional integrated security networks, the alarm control panel 14 is provided with firmware/software builds and/or various configuration settings which may dictate the communication, features, operational functionality and the like of the alarm control panel 14. Such alarm control panel configuration settings are usually configured at the time of installation by the installer. However, as alluded to above, the manual configuration of each of the alarm control panel configuration settings is time consuming and furthermore error prone potentially resulting in the misconfiguration of alarm control panel 14.

The setting of control panel 14 configuration settings are further complicated on account of control setting hierarchy wherein, for example, the control panel 14 may comprise default configuration settings which are overridden by provider specific configuration settings which are overridden again by user specific configuration settings.

As such, there will be described the automated provision of alarm control panel configuration settings. Specifically, during the installation procedure, the alarm control panel 14 is configured to request alarm control panel configuration settings from the network operator server 3.

The network operator server 3 is in operable communication with the database 5 comprising various alarm control panel configuration settings. As such, upon receipt of the alarm control panel configuration settings request from an alarm control panel 14, the operational server is configured to retrieve the appropriate alarm control panel configuration settings for provision to the requesting alarm control panel 14. Upon receipt of the provided alarm control panel configuration settings, the alarm control panel 14 may utilize the provided configuration settings so as to control the communication, features, operational functionality and the like of the long control panel 14.

Figure 8:
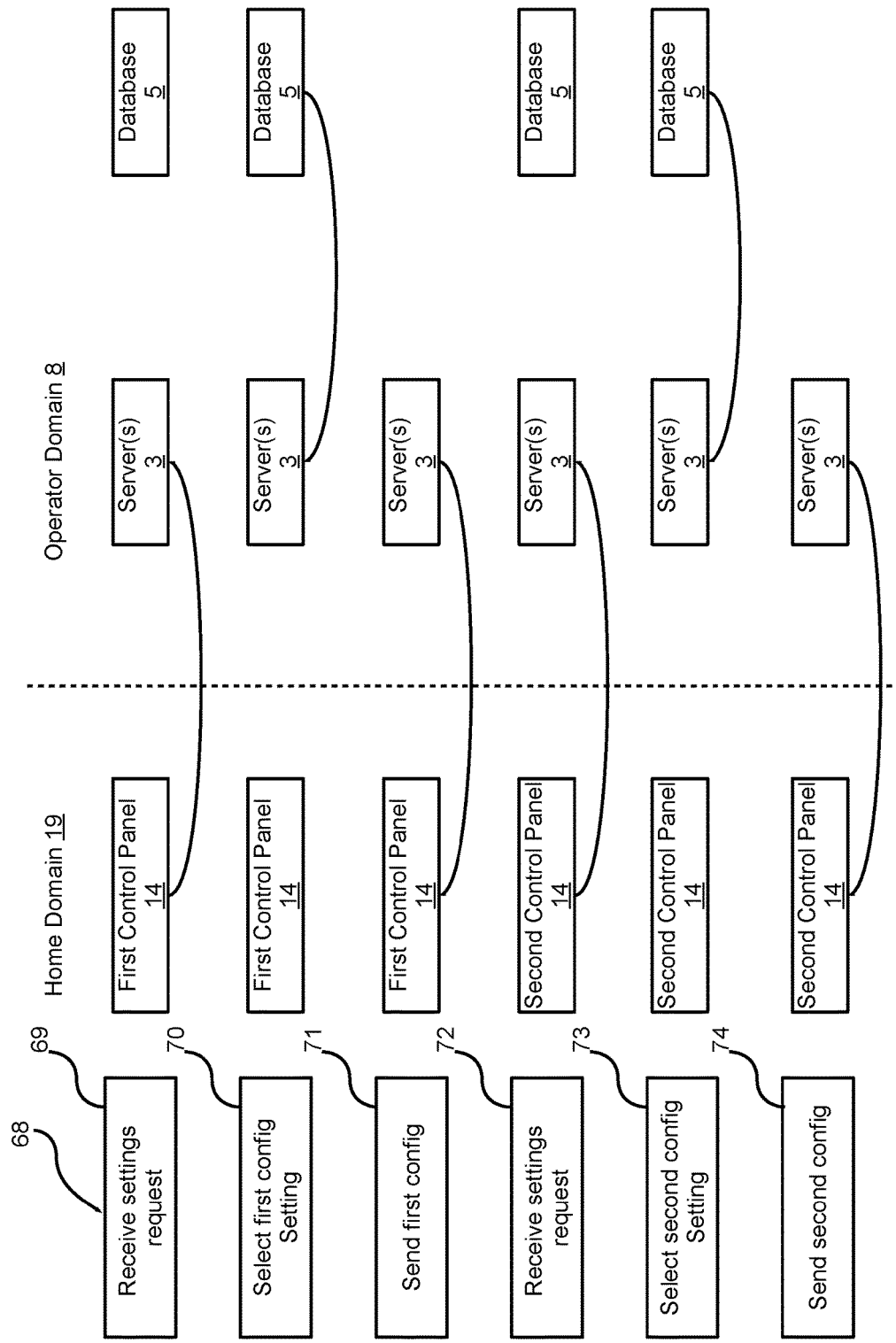
FIG. 8 shows an interaction diagram representing the provision of alarm control panel configuration settings in accordance with an embodiment of the present disclosure.
Figure 9:
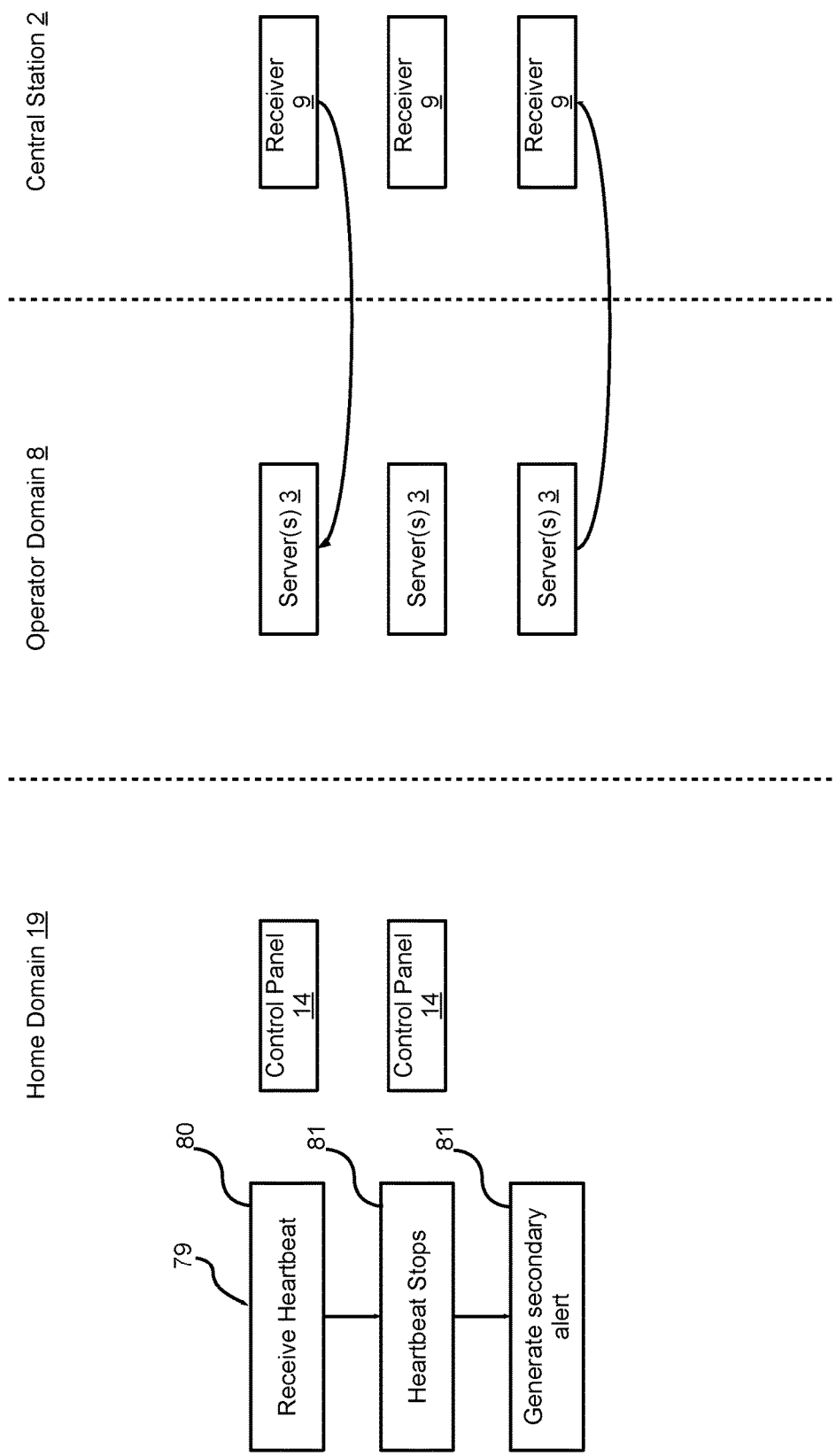
FIG. 9 shows an interaction diagram representing central station monitoring for receiver alarm signal transportation management in accordance with an embodiment of the present disclosure.

As such, referring to FIG. 8, there is shown an interaction diagram for the provision of alarm control panel configuration settings to two alarm control panels 14.

The interaction diagram shows the method 68 for the provision of alarm control panel configuration settings, wherein each step of the method 68 corresponds horizontally to the appropriate actors, being the control panel 14, operator server 3 and operated database 3.

It should be noted that the provision of the alarm control panel configuration settings is performed by the operator server 3. In this regard, and referring to FIG. 2, the operator server 3 comprises a memory device 3 for storing digital data, including computer program code. The operator server 3 further comprises a processor 35 for processing digital data, the processor 35 being in operable communication with a memory device 34. Furthermore, the operator server 3 comprises a data interface 40 sending and receiving data, the data interface 40 being in operable communication with the processor 35.

As such, the method 68 starts at step 69 when the operator server 3 is configured to receive, via an alarm control panel data connection from a first alarm control panel 14, an alarm control panel configuration settings request.

Specifically, as alluded to above, such a control panel configuration settings request may be received from the alarm control panel 14 during the installation or first-time use of the alarm control panel 14. In this regard, the firmware/software of the alarm control panel 14 may be configured, such that during the installation or first-time use, prior to operation, the alarm control panel 14 is configured to request the alarm control panel settings from the operator server 3. In this regard, alarm control panel 14 may be provided with appropriately configured firmware/software or other settings representing connection settings to the appropriate server 3 for the retrieval of the configuration settings. In embodiments, an encrypted configuration may be utilized for security purposes.

Now, as alluded to above, the database 5 may comprise various configuration settings. These configuration settings may be specific to particular alarm control panel 14 types, providers associated with alarm control panels 14, customer types, individual customers, regions and the like.

As such, at step 70, the operator server 3 is configured to establish a database connection to the database 5 and select, from the database, first configuration settings. The manner in which the appropriate configuration settings are selected will be described in further detail below.

At step 71, the operator server 3 is configured to send the panel configuration settings to the first control panel 14. It should be noted that, whereas in the preferred embodiment described herein wherein the operator server 3 is configured to serve configuration settings, in other embodiments, the operator server 3 may be configured to serve firmware/software build images such that upon receipt of such firmware/software build images the alarm control panel 14 may flash the ROM memory of the alarm control panel 14 or install the software with the received firmware/software build image.

Continuing now, the method 68 is configured to send second configuration settings to a second alarm control panel. Specifically, at step 72 of method 68, the operator server 3 is configured to receive a further settings request from a second alarm control panel 14. In a similar manner, at step 73, the operator server 3 is configured to select the appropriate configuration settings from the database and, at step 74, the operator server 3 is configured to send the second configuration settings to the second control panel 14.

In one embodiment, the appropriate configuration settings may be identified by the operator server 3 in accordance with a unique control panel ID. In this manner, each alarm control panel 14 may be provided with a unique ID. Similarly, the database 5 may be configured with a table of unique alarm control panel IDs and related configuration settings. As such, upon receipt of the unique ID from an alarm control panel 14, the operator server 3 is configured to select the appropriate configuration settings for serving.

However, as alluded to above, configuration settings may be unique to other categories also, such as the type of alarm control panel 14, the provider of the alarm control panel 14, the type of end user, the individual end user, the type of end user account, geographical region and the like.

As such, in alternative embodiments, the alarm control panel 14 may be configured to send other identifiers identifying such alarm control panel type, alarm control panel provider, end-user type, end user ID, end user account type geographic region and the like. In embodiments, one or a combination of such identifiers may be provided by the alarm control panel 14.

In embodiments, and especially where multiple identifiers are provided, the operator server 3 may be configured to apply a hierarchy.

For example, the alarm control panel configuration setting hierarchy may comprise a first layer comprising default settings. Such default settings may include, for example, a three-minute entry delay setting.

The next hierarchy of the control panel configuration settings may comprise alarm control panel type settings. For example, a particular type of alarm control panel 14 may have home automation capabilities and therefore, for this type of alarm control panel 14, the server may be configured to serve configuration settings so as to allow the control panel 14 to control various automation devices 12.

The next hierarchy of the control panel configuration settings may comprise provider specific settings. For example, a particular alarm control panel provider 14 may require that alarm signals are to be sent to a particular receiver 9. In this regard, upon receipt of a provider ID from the alarm control panel 14, the operator server 3 may select the configuration settings from the database 5 comprising the appropriate communication settings so as to allow the alarm control panel 14 to communicate with the correct receiver 9.

A further hierarchy could be user specific configuration settings wherein, for example, the user specifies a four minute entry delay as opposed to the default three minute delay.

It should be noted that various hierarchies may be utilized depending on the application and desired outcome within the purposive scope of the embodiments described herein.

It should be noted that where a hierarchy is used, the configuration settings of the upper layers of the hierarchy would override the configuration settings of the lower levels of the hierarchy.

E. Alarm Control Panel Configured for Home Owner Activity Simulation

In accordance with a further embodiment of the present disclosure, there will now be described the alarm control panel 14 configured for home owner activity simulation.

Referring to FIG. 1, homeowners and the like may use timing devices and the like to selectively power home lighting so as to attempt to simulate home owner activity to deter intruders. However, as alluded to above also, such timing devices must be deployed and configured individually, requiring departing homeowners to engage in a two-stage process of setting the timing devices and then also the alarm system. Furthermore, such timing devices are usually hardwired requiring individual and physical installation prior to departing.

As such, in the embodiment that follow, there will now be described the alarm control panel 14 configured for home owner activity simulation. Specifically, as will become apparent from the description below, the homeowner activity simulation is initiated by the control panel 14 being advantageous in allowing for the implementation of homeowner activity while the alarm control panel 14 is armed. Furthermore, in a preferred embodiment, the alarm control panel 14 is configured for wireless implementation, wherein, for example, the control panel 14 may utilize Z wave transceivers and the like so as to communicate with a plurality of Z wave receivers.

Specifically, referring to FIG. 1, as can be seen, the home domain 19 comprises the control panel 14 in operable communication with one or more home automation devices 12. As alluded to above, such home automation devices 12 may automate various aspects, such as by controlling the supply of power to various devices, such as lights, music systems and the like. Furthermore, the automation devices 12 may comprise mechanical actuators, such as to be able to draw blinds, curtains and the like.

Referring to FIG. 2, the alarm control panel 14 comprises a memory device 34 for storing digital data, including computer program code. Furthermore, the control panel 14 comprises a processor 35 for processing digital data, the processor 35 being in operable communication with a memory device 34. Furthermore, the control panel 14 comprises a home automation device data interface configured to at least send data to at least one home automation device. As such, in use, the processor 35 is controlled by the computer program code to send, to the at least one home automation device, automation instructions configured to simulate homeowner activity.

In a preferred embodiment, the control panel 14 is configured to determine when to initiate the simulation activity. In one embodiment, the control panel 14 is configured to initiate the simulation activity when the alarm control panel 14 is armed. As such, in this manner, when the homeowner departs the premises and arms the alarm control panel 14, the alarm control panel 14 may begin the home activity simulation.

In further embodiment, the control panel 14 may initiate the simulation activity in other manners, such as for example, when detecting inactivity. For example, should the control panel 14 ascertain from the motion sensors 13 a period of sustained inactivity, the control panel 14 may initiate this simulation. In embodiments, such initiation of simulation may be restricted to certain time periods, such as during the day, so as to prevent the control panel 14 from initiating simulation during the night while the homeowner is asleep.

In yet further embodiment, the control panel 14 is configured to implement the simulation in accordance with whether it is day or night. Specifically, differing simulation automations may be implemented during the day as compare to at night. For example, during the daytime, the control panel 14 wouldn't necessarily illuminate the lights but may, for example, raise the blinds and withdraw the curtains. The control panel 14 may ascertain whether it is day or night in accordance with a timer, or alternatively by receiving data from illumination sensors 13.

In embodiments, the home automation may be substantially randomised by the control panel 14 wherein, the control panel 14 randomly activates and deactivates various automation devices 12.

In other embodiments, the home automation may be in accordance with a predetermined set schedule.

In embodiments, the home automation instructions may be stored within the memory device 34 of the control panel 14. As such, during the home automation process, the control panel 14 will retrieve the home automation instructions from the memory device 34 so as to control the automation devices 12 accordingly.

However, in other embodiment, the home automation instructions may be received via the communication interface 15, such as from the operator server 3. In this manner, the operator server 3 may control the simulation activity process. In one manner, the operator server 3 may control the simulation activity and substantial real time however, in other manners, the operator server 3 may send simulation activity play out instructions for storage within the memory 34 of the control panel 14 for subsequent play out.

In a preferred embodiment, home automation device data interface is a wireless data interface so as to allow the controlling of the home automation devices 12 by the control panel 14 wirelessly. In one particular embodiment, the wireless data interface utilises the Z wave protocol.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. For example, any formulas given above are merely representative of procedures that may be used. Functionality may be added or deleted from the block diagrams and operations may be interchanged among functional blocks. Steps may be added or deleted to methods described within the scope of the present invention. Although the invention has been described with reference to specific examples, it will be appreciated by those skilled in the art that the invention may be embodied in many other forms.

We claim:

1. A computerized security system, comprising: a local security system configured for monitoring a premises and comprising a plurality of sensors in operable communication with an alarm control panel, the control panel comprising a digital processor, non-transitory computer memory, computer program code stored on said non-transitory computer memory, a data interface for sending and receiving data, said processor being in operable communication with the non-transitory computer memory and controlled by the computer program code to execute the steps of, monitoring said plurality of sensors to detect an alarm condition, sending a provisional alarm signal via said data interface upon detection of an alarm condition, waiting a predetermined delay interval for disablement of said alarm condition, and sending an actual alarm signal via said data interface; a central monitoring station (CMS) configured for monitoring a plurality of local control panels and comprising a plurality of receivers each in operable communication with a predetermined subset of said plurality of alarm control panels, the CMS comprising a digital processor, non-transitory computer memory, an automation server, and a data interface for sending and receiving data, said processor being in operable communication with the non-transitory computer memory and controlled by the computer program code to execute the steps of, receiving said actual alarm signal from said local control panel, and said application server selectively executing alarm management software for notifying a human operator; and an operator server comprising a processor for processing digital data, non-transitory computer memory, computer program code stored on said non-transitory computer memory, and a data interface for sending and receiving data, said processor being in operable communication with the non-transitory computer memory and controlled by the computer program code to execute the steps of, receiving, via the data interface, said provisional alarm signal, detecting that said actual alarm signal has was not received by the CMS, and sending a failure notification to said CMS to indicate that said actual alarm signal was not received by the CMS.

2. The computerized security system according to claim 1, wherein said operator server establishes, via the data interface, a persistent data connection with the CMS receiver, and executes the additional step of monitoring said persistent data connection.

3. The computerized security system according to claim 1, wherein said operator server step of detecting that said actual alarm signal has was not received by the CMS further comprises detecting whether the actual alarm signal was received by the CMS receiver.

4. The computerized security system according to claim 1, wherein said step of detecting whether the actual alarm signal was received by the CMS receiver comprises detecting whether said actual alarm signal was simultaneously received by said operator server.

5. The computerized security system according to claim 1, wherein said step of detecting whether the actual alarm signal was received by the CMS receiver comprises comparing the actual alarm signal received by the CMS receiver to the actual alarm signal received by said operator server.

6. The computerized security system according to claim 1, wherein said step of detecting whether the actual alarm signal was received by the CMS receiver comprises comparing a unique identifier of the actual alarm signal received by the CMS receiver to a unique identifier of the actual alarm signal received by said operator server.

7. The computerized security system according to claim 1, wherein said operator server processor and computer program code executes the additional step of sending an acknowledgement signal to said local control panel after receipt of said provisional alarm signal.

8. The computerized security system according to claim 1, wherein said operator server processor and computer program code executes the additional step of sending a request to said local control panel a signal resend instruction.

9. The computerized security system according to claim 1, wherein said operator server processor and computer program code executes the additional step of forwarding a signal received from said local control panel to said CMS upon detection that said CMS did not receive said signal directly.

10. The computerized security system according to claim 1, wherein said operator server processor and computer program code executes the additional step of forwarding a signal received from said CMS to said local control panel.

11. The computerized security system according to claim 10, wherein said operator server processor and computer program code executes the additional step translating said signal received from said local control panel to a format compatible with said CMS.

12. The computerized security system according to claim 10, wherein said operator server processor and computer program code executes the additional step translating said signal received from said CMS to a format compatible with said local control panel.

13. A method for the distribution of private shared keys (PSKs) across a security monitoring network, the method comprising: generating a first shared private key (PSK); providing the first PSK to a first central station receiver; providing the first PSK to a first alarm control panel and a second alarm control panel, the first alarm control panel and the second alarm control panel been associated with the first central station receiver; generating a second PSK; providing the second PSK to a second central receiver; providing the second PSK to a third alarm control panel and a fourth alarm control panel, the third alarm control panel and the fourth alarm control panel been associated with the second central receiver.

* * * * *